United States Patent
Kawamura et al.

(10) Patent No.: US 8,797,946 B2
(45) Date of Patent: Aug. 5, 2014

(54) USER DEVICE, BASE STATION, AND METHOD

(75) Inventors: Teruo Kawamura, Yokosuka (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1009 days.

(21) Appl. No.: 12/531,570

(22) PCT Filed: Mar. 13, 2008

(86) PCT No.: PCT/JP2008/054636
§ 371 (c)(1),
(2), (4) Date: Dec. 3, 2009

(87) PCT Pub. No.: WO2008/114694
PCT Pub. Date: Sep. 25, 2008

(65) Prior Publication Data
US 2010/0118773 A1 May 13, 2010

(30) Foreign Application Priority Data
Mar. 20, 2007 (JP) .................... 2007-073725

(51) Int. Cl.
*H04W 4/00* (2009.01)
(52) U.S. Cl.
USPC ............................................. 370/328
(58) Field of Classification Search
USPC ............................................. 370/328
See application file for complete search history.

(56) References Cited

U.S. PATENT DOCUMENTS

| | | | |
|---|---|---|---|
| 2003/0099211 A1* | 5/2003 | Moulsley et al. | 370/328 |
| 2003/0206524 A1* | 11/2003 | Mohanty et al. | 370/236 |
| 2007/0041429 A1* | 2/2007 | Khandekar | 375/146 |
| 2008/0310540 A1* | 12/2008 | Tiirola et al. | 375/267 |
| 2009/0303929 A1 | 12/2009 | Yamamoto et al. | |

FOREIGN PATENT DOCUMENTS

| | | |
|---|---|---|
| JP | 2008-136156 A | 6/2008 |
| JP | 2009-543528 T | 12/2009 |
| JP | 2010-506505 T | 2/2010 |
| JP | 2010-506531 | 2/2010 |
| WO | 2008006088 A2 | 1/2008 |
| WO | 2008/042904 A2 | 4/2008 |
| WO | 2008/048055 A1 | 4/2008 |
| WO | 2008053930 A1 | 5/2008 |

OTHER PUBLICATIONS

Japanese Office Action for Application No. 2007-073725, mailed on Mar. 16, 2010 (9 pages).
David C. Chu, "Polyphase Codes with Good Periodic Correlation Properties", IEEE Transactions on Information Theory, Jul. 1972, pp. 531-532.

(Continued)

*Primary Examiner* — Noel Beharry
(74) *Attorney, Agent, or Firm* — Osha Liang LLP

(57) ABSTRACT

A disclosed user device generates an uplink control channel including at least one of acknowledgement information and a channel quality indicator regarding downlink and transmits the uplink control channel via a dedicated frequency band when no resource is allocated for transmission of an uplink data channel. The uplink control channel includes multiple unit blocks constituting a subframe and each of the unit blocks includes a sequence generated by multiplying all chips of an orthogonal code sequence assigned to the user device by the same factor.

4 Claims, 15 Drawing Sheets

(56) References Cited

OTHER PUBLICATIONS

3GPP TSG RAN WG1 Ad Hoc on LTE, R1-050822, London, UK, Aug. 29-Sep. 2, 2005, "On Allocation of Uplink Pilot Sub-Channels in EUTRA SC-FDMA".

International Search Report w/translation from PCT/JP2008/054636 dated Apr. 22, 2008 (3 pages).

Written Opinion from PCT/JP2008/054636 dated Apr. 22, 2008 (3 pages).

3GPP TSG RAN WG1 Meeting #47, R1-063354; "CDMA based Multplexing of ACK/NACK and CQI Control Information in E-UTRA Uplink"; Riga, Latvia; Nov. 6-10, 2006 (4 pages).

3GPP TSG RAN WG1 Meeting #46bis, R1-062742; "CDM-based Multiplexing Method of Multiple ACK/NACK and CQI for E-UTRA Uplink"; Seoul, Korea; Oct. 9-13, 2006 (6 pages).

3GPP TSG RAN WG1 LTE Ad Hoc, R1-061675; "Data-non-associated L1/L2 Control Channel Structure for E-UTRA Uplink"; Cannes, France; Jun. 27-30, 2006 (6 pages).

* cited by examiner

USER DEVICE, BASE STATION, AND METHOD

TECHNICAL FIELD

The present invention generally relates to mobile communication technologies. More particularly, the present invention relates to a user device, a base station, and a method used in a mobile communication system.

BACKGROUND ART

In the field of mobile communication technologies, research and development of next generation communication systems are being conducted at a rapid pace. In a candidate next generation communication system, a single-carrier scheme is to be used for uplink to reduce the peak-to-average power ratio (PAPR) while achieving wide coverage. Also in this communication system, uplink and downlink radio resources are allocated to users according to their communication conditions in the form of shared channels to be shared by the users. The process of allocating radio resources is called "scheduling". In order to perform uplink scheduling properly, each user device transmits a pilot channel to a base station and the base station estimates uplink channel conditions of the user device based on the reception quality of the pilot channel. Similarly, in order to perform downlink scheduling properly, the base station transmits a pilot channel to the user device and the user device reports information indicating channel conditions (channel quality indicator (CQI)) to the base station based on the reception quality of the pilot channel. The base station evaluates downlink channel conditions of user devices based on CQIs reported from the user devices and performs downlink scheduling based on the evaluation results.

Meanwhile, uplink control channels may be categorized into first control information (essential control information) that is always sent together with an uplink data channel and second control information that is sent regardless of the presence or absence of an uplink data channel. The first control information includes information that is necessary to demodulate a data channel such as the modulation scheme and the channel coding rate of the data channel. The second control information includes a downlink CQI, acknowledgement information (ACK/NACK) for a downlink data channel, and/or a resource allocation request. A user device may transmit only the first control information, only the second control information, or both of them via an uplink control channel.

In a proposed method, when a resource block (radio resources) is allocated for transmission of an uplink data channel, the first control information (and also the second control information if necessary) is transmitted using the allocated resource block; and when no uplink data channel is to be transmitted, the second control information is transmitted using dedicated resources (dedicated frequency band). This method is described below in more detail.

FIG. 1 is a drawing illustrating an example of uplink frequency band allocation. In FIG. 1, two sizes of resource blocks, large and small, are provided. The large resource blocks have a bandwidth $F_{RB1}$ of 1.25 MHz and a time period $T_{RB}$ of 0.5 ms. The small resource blocks have a bandwidth $F_{RB2}$ of 375 kHz and a time period $T_{RB}$ of 0.5 ms. The time period may also be called a unit transmission period, a transmission time interval (TTI), or a subframe. One time period may correspond to the duration of one wireless packet. In FIG. 1, six resource blocks are arranged in the frequency direction and the small resource blocks are located at the right and left ends. Various arrangement patterns may be used to arrange resource blocks as long as they are known to the sending and receiving ends. In the example shown in FIG. 1, uplink scheduling is performed such that control channels (first control channels) accompanying uplink data channels and if necessary, second control channels are transmitted in parts of the time periods of the respective large resource blocks (the second, third, fourth, and fifth resource blocks). Also, transmission timings of user devices are adjusted such that control channels (second control channels) are transmitted using the small resource blocks (the first and sixth resource blocks) when uplink data channels are not to be transmitted. A second control channel of a user device may be transmitted using two small resource blocks. In this example, the second control channel of user device A is transmitted using the sixth resource block in the second subframe and the first resource block in the third subframe. Similarly, the second control channel of user device B is transmitted using the sixth resource block in the third subframe and the first resource block in the fourth subframe. Thus, a second control channel is transmitted so as to "hop" in the frequency and time directions. This method makes it possible to achieve time and frequency diversity gain and to increase the probability that the second control channel is properly demodulated by the base station.

FIG. 2 is a drawing illustrating another example of uplink frequency band allocation. As in FIG. 1, two sizes of resource blocks, large and small, are provided in FIG. 2. In this example, a time period $T_{RB}$ of each subframe of the small resource blocks (first and sixth resource blocks) is divided into two sub-periods. In FIG. 2, the second control channel of user device A is transmitted using the first resource block in a first sub-period (the first half) of the first subframe and the sixth resource block in a second sub-period (the second half) of the same first subframe. Similarly, the second control channel of user device B is transmitted using the sixth resource block in the first sub-period of the first subframe and the first resource block in the second sub-period of the first subframe. The second control channels of user devices A and B are also transmitted in a similar manner in the third and fifth subframes. Thus, a second control channel is transmitted so as to "hop" in the frequency and time directions. This method makes it possible to achieve time and frequency diversity gain and to increase the probability that the second control channel is properly demodulated by the base station. Also with this method, transmission of a control channel of user device A is completed within one subframe and transmission of a control channel of user device B is also completed within one subframe. Therefore, this method is preferable to reduce transmission delay of uplink control channels. The above technologies are disclosed, for example, in 3GPP, R1-061675.

DISCLOSURE OF INVENTION

Problems to be Solved by the Invention

In FIGS. 1 and 2, control channels of user devices A and B are indicated by labels "Control A" and "Control B" and it looks like as if each small resource block is exclusively used by the corresponding user device A or B. However, it is preferable to share a resource block by multiple user devices to improve resource use efficiency. For example, it may be possible to share resources of a dedicated frequency band using frequency division multiplexing (FDM). However, if users are simply multiplexed by FDM, a frequency band allocated to each user becomes narrow and the number of chips included in the frequency band decreases (the chip rate is reduced). This in turn may decrease the number of orthogonal code sequences used to distinguish pilot channels of user devices and increase the interference level. Also, if it is allowed to frequently change the transmission bandwidth of an uplink control channel according to, for example, the number of multiplexed users, the base station has to report the change in the transmission bandwidth to user devices each time it occurs. This in turn increases the amount of downlink control information (signaling overhead) and may decrease the transmission efficiency of data channels. Alternatively, code division multiplexing (CDM) employed in W-CDMA mobile communication systems may be used to share resources of a dedicated frequency band. With CDM, it is possible to increase the bandwidth to be allocated to each user. However, this method may increase the interference power level and reduce the signal quality. Also, if the acknowledgement information (ACK/NACK) and the channel quality indicator (CQI) of the same user are multiplexed by CDM, the peak power may increase.

One object of the present invention is to provide a user device, a base station, and a method that make it possible to increase the number of multiplexed users in a case where uplink control channels each including at least one of acknowledgement information (ACK/NACK) for a downlink data channel and a downlink channel quality indicator (CQI), particularly uplink control channels each including ACK/NACK information represented by one bit, are transmitted from multiple user devices by a single-carrier scheme.

Means for Solving the Problems

An aspect of the present invention provides a user device that transmits at least an uplink control channel by a single-carrier scheme to a base station. The user device includes an acknowledgement information generating unit configured to generate acknowledgement information indicating acknowledgement or negative acknowledgement for a downlink data channel; a control channel generating unit configured to generate the uplink control channel including the acknowledgement information; and a transmitting unit configured to transmit the uplink control channel using a dedicated frequency band when no resource is allocated for transmission of an uplink data channel. The uplink control channel includes multiple unit blocks constituting a subframe and each of the unit blocks includes a sequence generated by multiplying all chips of an orthogonal code sequence assigned to the user device by the same factor.

Another aspect of the present invention provides a method used by a user device that transmits at least an uplink control channel by a single-carrier scheme to a base station. The method includes the steps of generating the uplink control channel including acknowledgement information indicating acknowledgement or negative acknowledgement for a downlink data channel; and transmitting the uplink control channel using a dedicated frequency band when no resource is allocated for transmission of an uplink data channel. The uplink control channel includes multiple unit blocks constituting a subframe and each of the unit blocks includes a sequence generated by multiplying all chips of an orthogonal code sequence assigned to the user device by the same factor.

Another aspect of the present invention provides a base station that receives at least an uplink control channel by a single-carrier scheme from multiple user devices. The base station includes an extracting unit configured to extract acknowledgement information indicating acknowledgement or negative acknowledgement for a downlink data channel from the uplink control channel; a scheduling unit configured to schedule a new packet or a retransmission packet based on the acknowledgement information; and a transmitting unit configured to transmit the new packet or the retransmission packet via the downlink data channel. The uplink control channel includes multiple unit blocks constituting a subframe and each of the unit blocks includes a sequence generated by multiplying all chips of an orthogonal code sequence assigned to a corresponding one of the user devices by the same factor; and the extracting unit is configured to determine the content of the acknowledgement information by determining factors by which the respective unit blocks are multiplied and correlation power levels of the unit blocks.

Still another aspect of the present invention provides a method used by a base station that receives at least an uplink control channel by a single-carrier scheme from multiple user devices. The method includes the steps of extracting acknowledgement information indicating acknowledgement or negative acknowledgement for a downlink data channel from the uplink control channel; scheduling a new packet or a retransmission packet based on the acknowledgement information; and transmitting the new packet or the retransmission packet via the downlink data channel. The uplink control channel includes multiple unit blocks constituting a subframe and each of the unit blocks includes a sequence generated by multiplying all chips of an orthogonal code sequence assigned to a corresponding one of the user devices by the same factor; and in the extracting step, the content of the acknowledgement information is determined by determining factors by which the respective unit blocks are multiplied and correlation power levels of the unit blocks.

Advantageous Effect of the Invention

An aspect of the present invention provides a user device, a base station, and a method that make it possible to increase the number of multiplexed users in a case where uplink control channels each including at least one of acknowledgement information (ACK/NACK) for a downlink data channel and a downlink channel quality indicator (CQI), particularly uplink control channels each including ACK/NACK information represented by one bit, are transmitted from multiple user devices by a single-carrier scheme.

EXPLANATION OF REFERENCES

Figure 1:
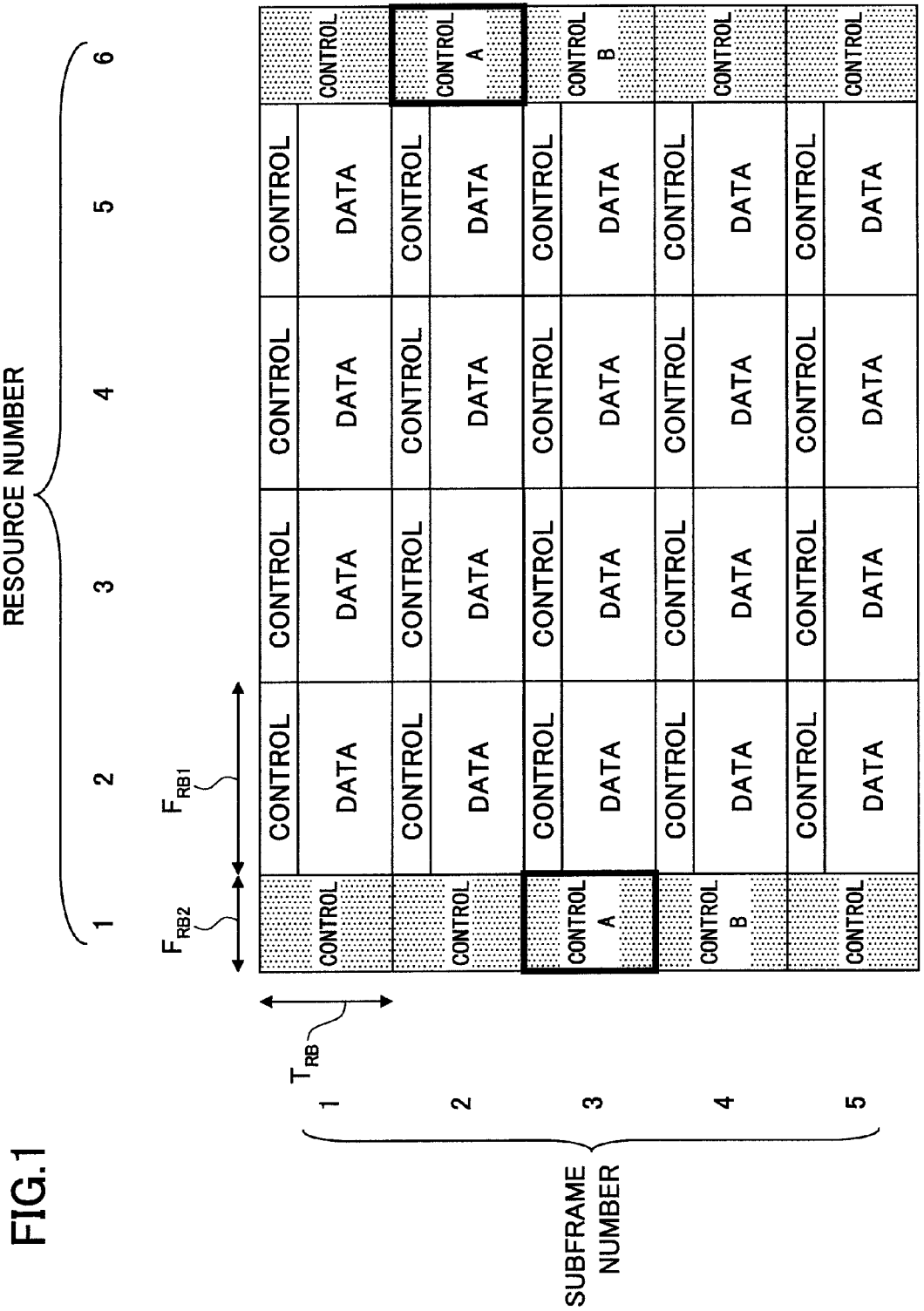
FIG. 1 is a drawing illustrating an example of frequency band allocation in a mobile communication system.
Figure 2:
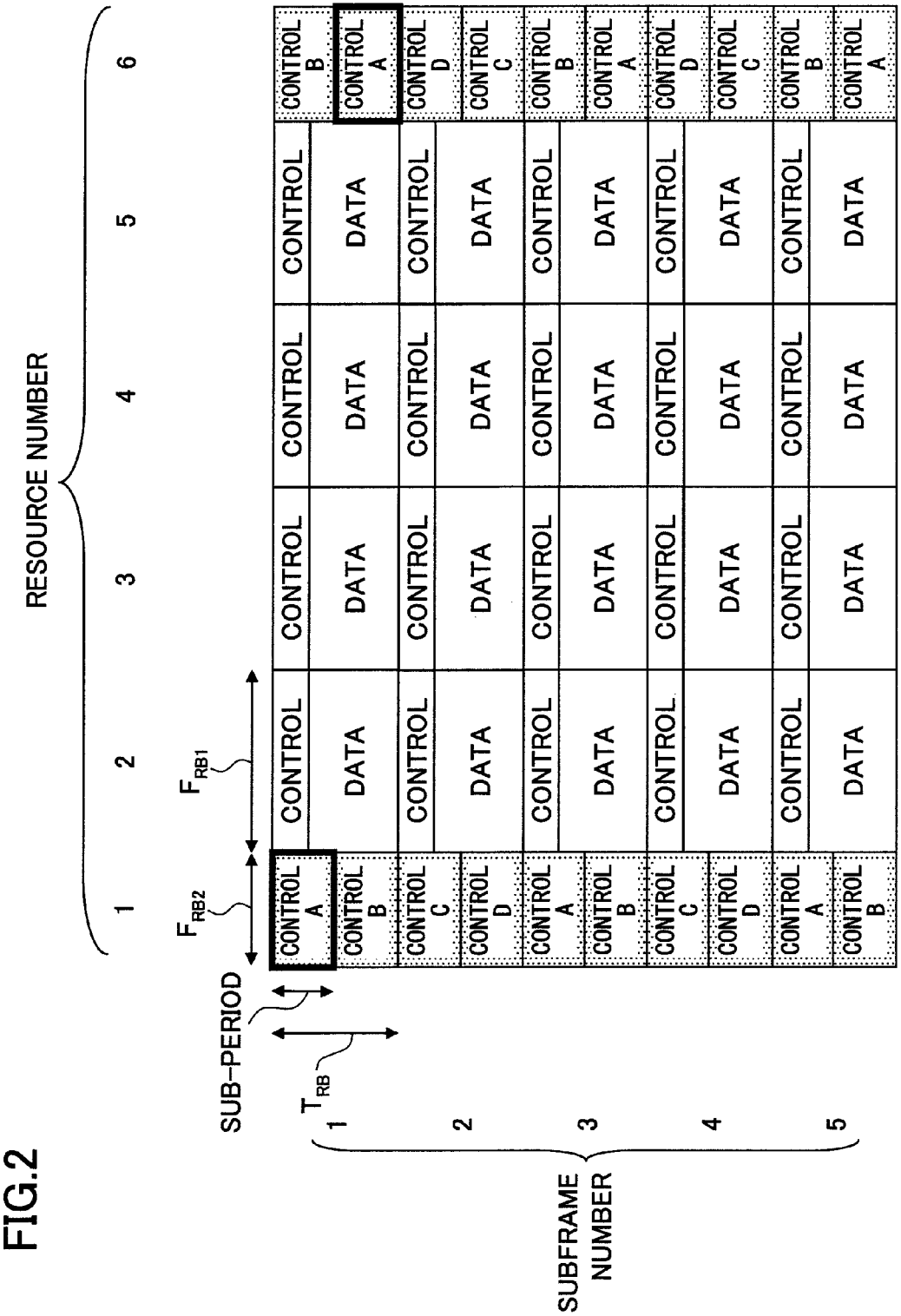
FIG. 2 is a drawing illustrating another example of frequency band allocation in a mobile communication system.

302 CQI estimation unit
304 ACK/NACK determining unit
306 Block modulation pattern generating unit
308 Block modulation unit
310 Discrete Fourier transform unit (DFT)
312 Sub-carrier mapping unit
314 Inverse fast Fourier transform unit (IFFT)
316 Cyclic prefix (CP) adding unit
318 Multiplexing unit
320 RF transmission circuit
322 Power amplifier
324 Duplexer
330 Code information identification unit
332 Constant Amplitude Zero Auto-Correlation (CAZAC) code generating unit
334 Cyclic shift unit
335 Block spreading unit
336 Frequency determining unit
338 Pilot signal generating unit
340 Pilot configuration determining unit
702 Duplexer
704 RF reception circuit
706 Reception timing estimation unit
708 Fast Fourier transform unit (FFT)
710 Channel estimation unit
712 Sub-carrier demapping unit
714 Frequency domain equalization unit
716 Inverse discrete Fourier transform unit (IDFT)
718 Demodulation unit
720 Retransmission control unit
722 Scheduler
724 Code information setting unit
726 ACK/NACK correlation measuring unit
728 Noise power estimation unit
730 ACK/NACK determining unit

BEST MODE FOR CARRYING OUT THE INVENTION

The best mode for carrying out the invention is described based on the following embodiments with reference to the accompanying drawings.

Throughout the accompanying drawings, the same reference numbers are used for parts having the same functions, and overlapping descriptions of those parts are omitted.

According to an embodiment of the present invention, when no resource is allocated for transmission of an uplink data channel, an uplink control channel including at least one of acknowledgement information and a channel quality indicator is transmitted using a dedicated frequency band. An uplink control channel includes multiple unit block sequences (long blocks) each generated by multiplying all chips of an orthogonal code sequence (typically a Constant Amplitude Zero Auto-Correlation (CAZAC) sequence) assigned to a user device by the same factor. With this configuration, the base station can properly separate multiple users without disturbing the orthogonality between the users by processing uplink control signals from the users unit block sequence by unit block sequence. Since the size of acknowledge information and the size of a channel quality indicator are relatively small, each of the acknowledge information and the channel quality indicator can be satisfactorily expressed by using one or more factors by which a CAZAC code is multiplied.

According to an embodiment of the present invention, an uplink control channel that does not accompany an uplink data channel includes a CAZAC sequence duplicated for the number of long blocks and multiplied by a factor, and a pilot channel made of a CAZAC sequence. Therefore, the base station can process an uplink control channel without disturbing the characteristics of CAZAC codes by processing the uplink control channel long block by long block or short block by short block. This indicates that the orthogonal separability between users is good and the CAZAC codes of long blocks can be used also as reference signals for channel estimation, path search, and so on. In other words, the above method makes it possible to use, in addition to a small number of short blocks including a pilot channel, many long blocks in an uplink control channel for purposes such as channel estimation, and therefore makes it possible to greatly improve the accuracy of channel estimation and path search.

According to an embodiment of the present invention, both code division multiplexing (CDM) using CAZAC codes and frequency division multiplexing (FDM) may be employed to multiplex uplink control channels of multiple user devices, but CDM is given preference over FDM. This method makes it possible to reduce the necessity of changing the transmission bandwidth of user devices. In FDM employed in this method, it is not necessary to divide the entire frequency band into frequency bands as narrow as 1/(number of multiplexed users). Therefore, this method makes it possible to allocate a relatively wide transmission band to an uplink control channel and thereby makes it possible to use a large number of code sequences for distinguishing users. Also with this method, since a relatively small number of bandwidths are used in FDM, it is possible to prevent frequent changes of the transmission bandwidth. Since the data sizes of acknowledgement information (ACK/NACK) and a channel quality indicator (CQI) are relatively small, it is difficult to greatly increase the signal quality even if the transmission bandwidth of the uplink control channel is frequently changed. Rather, it is preferable to reduce the overhead by preventing frequent changes of the transmission bandwidth and to improve the signal quality by transmission power control.

According to an embodiment of the present invention, a factor set (block spreading code) by which each set of two or more unit blocks having the same content is multiplied represents an orthogonal code sequence. Each unit block may include a sequence generated by multiplying all chips of an orthogonal code sequence by the same factor (a factor provided separately from the block spreading code). Using the block spreading code makes it possible to further increase the maximum number of code-division-multiplexed users. This in turn makes it possible to more effectively prevent the transmission bandwidth from being frequently changed due to the increase and decrease of the number of multiplexed users.

First Embodiment

Figure 3:
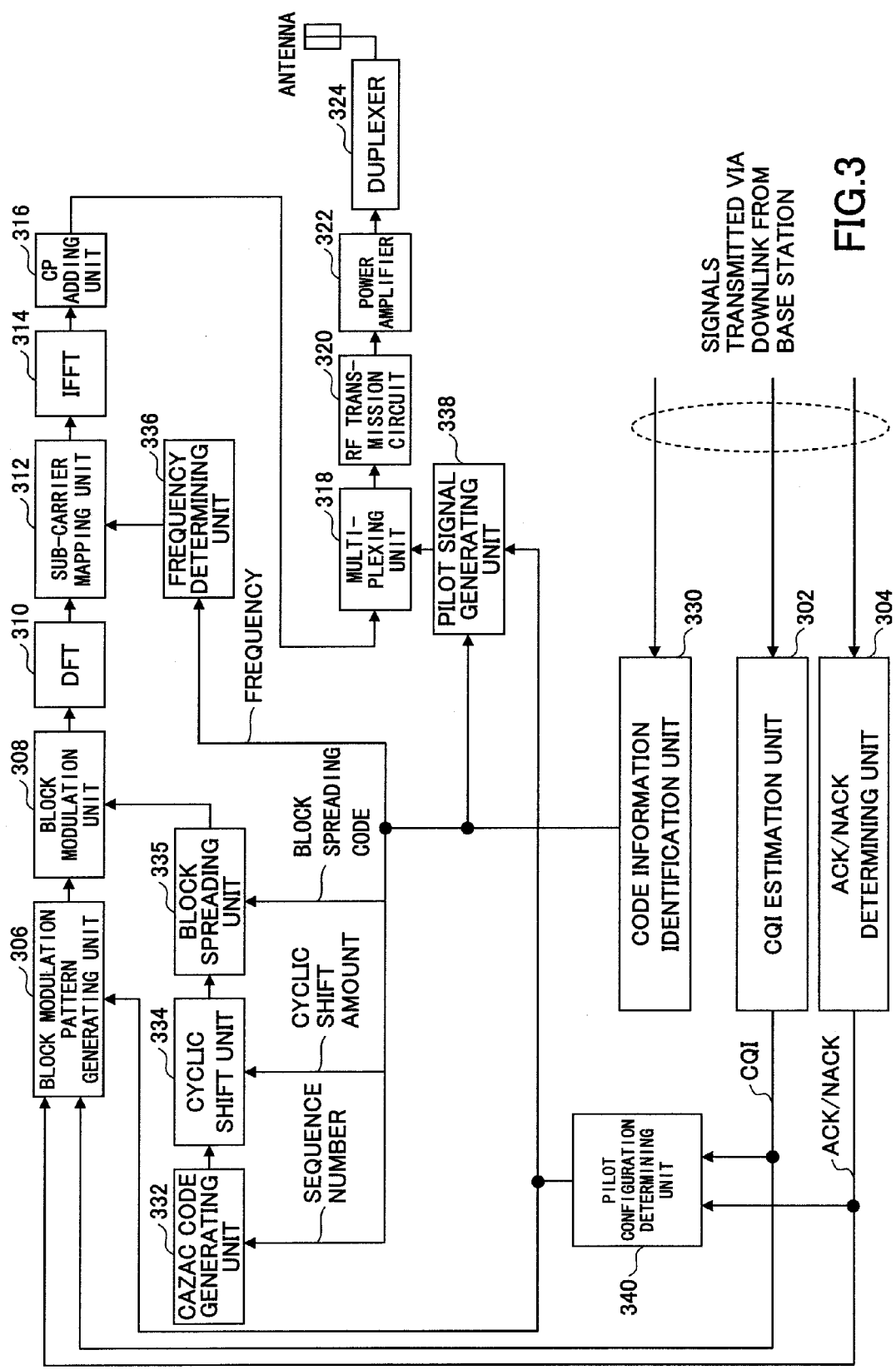
FIG. 3 is a partial block diagram of a user device according to an embodiment of the present invention.

FIG. 3 is a block diagram illustrating a user device according to an embodiment of the present invention. The user device shown in FIG. 3 includes a CQI estimation unit 302, an ACK/NACK determining unit 304, a block modulation pattern generating unit 306, a block modulation unit 308, a discrete Fourier transform unit (DFT) 310, a sub-carrier mapping unit 312, an inverse fast Fourier transform unit (IFFT) 314, a cyclic prefix (CP) adding unit 316, a multiplexing unit 318, an RF transmission circuit 320, a power amplifier 322, a duplexer 324, a code information identification unit 330, a CAZAC code generating unit 332, a cyclic shift unit 334, a block spreading unit 335, a frequency determining unit 336, a pilot signal generating unit 338, and a pilot configuration determining unit 340.

The CQI estimation unit 302 measures downlink channel conditions and outputs the measurement as a channel quality indicator (CQI). The channel quality indicator is obtained, for example, by measuring the reception quality (such as SIR or SINR) of a pilot channel transmitted from the base station and converting the measurement into a value according to a predetermined rule. For example, measured reception quality (SIR) may be converted into a CQI value indicating one of 32 levels and represented by 5 bits.

The ACK/NACK determining unit 304 determines whether there is an error in each of the packets constituting a received downlink data channel and outputs the determination result as acknowledgement information. The acknowledgement information indicates either acknowledgement (ACK) indicating that no error is found or negative acknowledgement (NACK) indicating that an error is found. Since the acknowledgement information indicates the presence or absence of an error in a received packet, it can be basically represented by one bit. However, any number of bits may be used for the acknowledgement information.

The block modulation pattern generating unit 306 arranges the channel quality indicator and the acknowledgement information (ACK/NACK) into block modulation patterns. In this embodiment, a subframe includes a predetermined number of blocks and plural subframes constitute a transmission time interval (TTI) used as a resource allocation unit.

Figure 4:
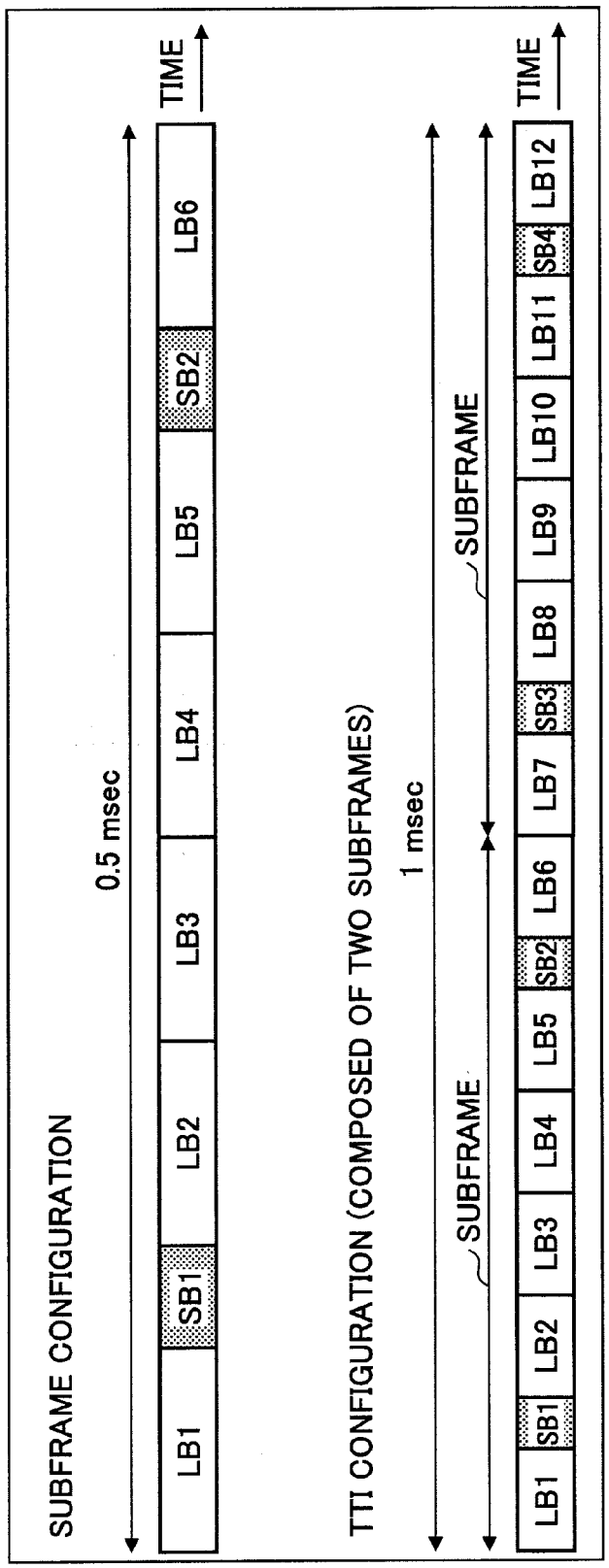
FIG. 4 is a drawing illustrating a TTI, subframes, and blocks.

FIG. 4 is a drawing illustrating a TTI, subframes, and blocks. In this example, one TTI is 1.0 ms and includes two subframes with a length of 0.5 ms. Each subframe includes six long blocks (LB) and two short blocks (SB). Each long block has a length of, for example, 66.7 μs and each short block has a length of, for example, 33.3 μs. These values are just examples and may be changed as needed. Normally, long blocks are used to transmit data (such as a control channel and a data channel) unknown to the receiving end and short blocks are used to transmit data (such as a pilot channel) known to the receiving end. In the example of FIG. 4, one TTI includes 12 long blocks (LB1 through LB12) and 4 short blocks (SB1 through SB4).

Alternatively, each subframe may include seven long blocks. In this case, a reference signal (pilot signal) for data demodulation (i.e., a demodulation reference signal) is mapped to one of the seven long blocks. Also, one or more of the seven long blocks other than the long block to which the demodulation reference signal is mapped are used to transmit sounding reference signals (pilot signals) used for scheduling, uplink transmission power control, and/or determination of transport formats of physical uplink shared channels in AMC. Multiple sounding reference signals from multiple mobile stations are multiplexed in a long block by code division multiplexing (CDM). In this case, one TTI composed of two subframes includes 14 long blocks. The demodulation reference signal is mapped, for example, to the fourth long block and the eleventh long block in a TTI.

The block modulation pattern generating unit 306 determines the correspondence between one or more of the 12 blocks (LB1-LB12) and bits representing the channel quality indicator (CQI) and/or the correspondence between one or more of the 14 blocks (LB1-LB12 and SB1-SB2, or 14 long blocks) and bits representing the acknowledgement information (ACK/NACK). A user device may transmit only the channel quality indicator, only the acknowledgement information, or both of them via an uplink control channel. In this embodiment, as detection methods for an uplink control channel, non-coherent detection is used for the acknowledgement information (ACK/NACK) and coherent detection is used for information other than the acknowledgement information. Coherent detection requires a pilot channel while non-coherent detection requires no pilot channel. For this reason, there are cases where (A) all 12 blocks are allocated to the channel quality indicator, (B) all 14 blocks are allocated to the acknowledgement information, and (C) some of 12 blocks are allocated to the channel quality indicator and the rest of 12 blocks are allocated to the acknowledgement information. In any case, according to the correspondence between blocks and information, one factor is provided for each of the 12 blocks all allocated to the channel quality indicator or allocated to both of the channel quality indicator and the acknowledgement information; or one factor is provided for each of the 14 blocks all allocated to the acknowledgement information.

Figure 5:
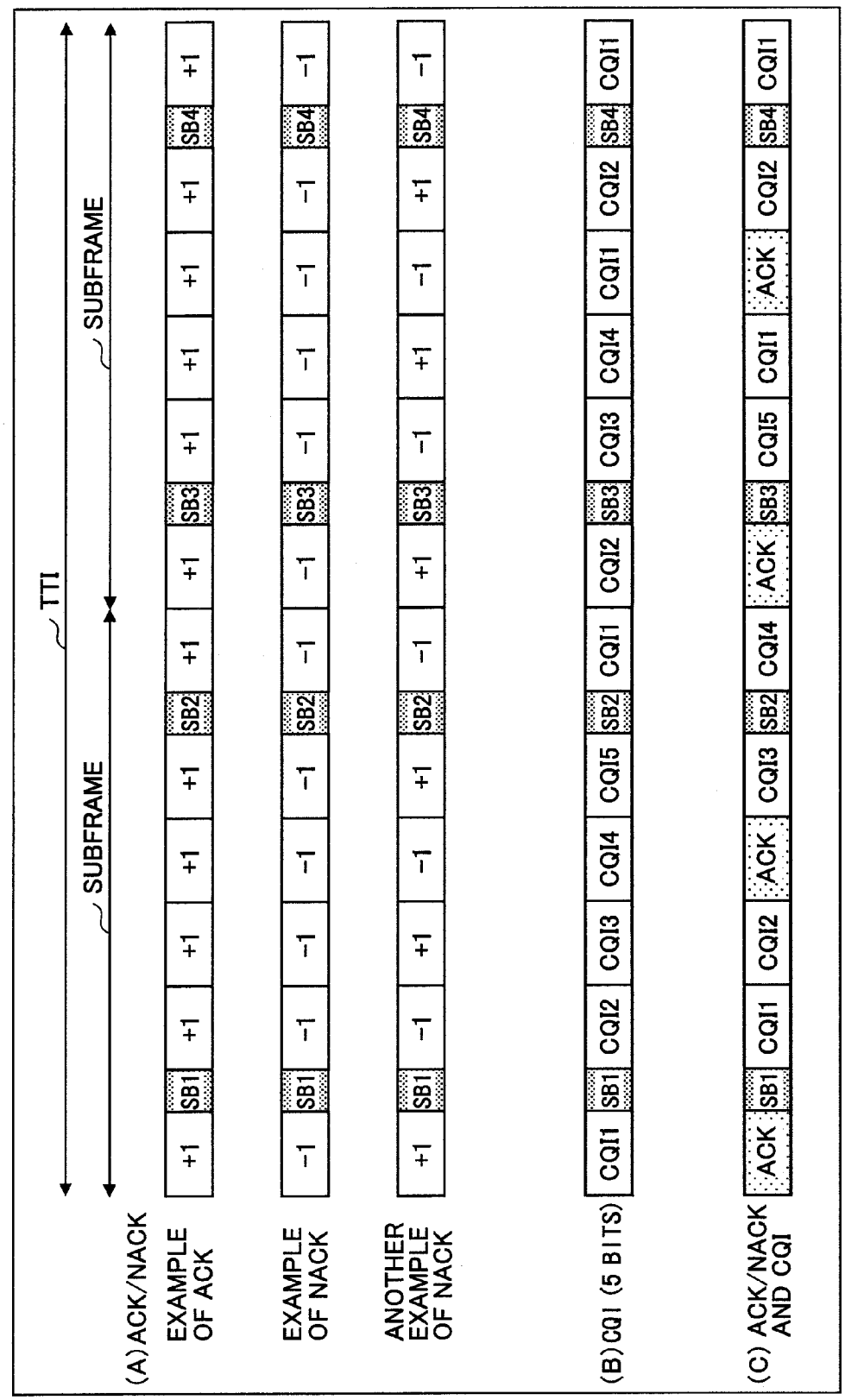
FIG. 5 is a drawing illustrating exemplary factors by which long blocks (LB) are multiplied.

FIG. 5 is a drawing illustrating exemplary factors by which long blocks are multiplied. In FIG. 5 (A), it is assumed that only the acknowledgement information (ACK/NACK) is transmitted. In this example, all 14 factors are "1" when acknowledgement (ACK) is reported and all 14 factors are "−1" when negative acknowledgement (NACK) is reported. Factors for SB1 through SB4 in FIG. 5(A) are also "1" when acknowledgement (ACK) is reported or "−1" when negative acknowledgement (NACK) is reported. In another example shown in FIG. 5(A), a combination of factors "+1" and "−1" is used to represent negative acknowledgement (NACK). The above values of factors are just examples. Any values may be used as long as a combination of 14 factors used for acknowledgement and a combination of 14 factors used for negative acknowledgement are different. Also, the number of factors used to represent the acknowledgement information is not limited to 14 and any number of factors may be used. For example, ACK/NACK may be represented by one factor, two factors like (+1, +1) or (+1, −1), or more than two factors. In the simplest case, ACK/NACK may be represented by one factor. However, to improve the accuracy of determining ACK/NACK, it is preferably represented by using phase shifts of multiple factors. Factors other than ±1, e.g., complex numbers, may also be used. Still, using factors ±1 makes it possible to perform calculations by simple sign inversion and is therefore preferable when multiplying all chips of a CAZAC sequence by the same factor as described later.

When the base station mistakenly identifies ACK as NACK, it just causes unnecessary retransmission of a packet to the user device. However, if the base station mistakenly identifies NACK as ACK, a packet necessary for packet composition is not retransmitted to the user device. As a result, a packet loss may occur or the user device composes a packet by incorrectly combining new packets, and the reception quality may be reduced greatly. Therefore, ACK/NACK is preferably represented by one or more factors such that misidentification of NACK as ACK is prevented.

In the example shown in FIG. 5(B), it is assumed that only the channel quality indicator (CQI) is transmitted. In FIG. 5(B), a CQI is represented by five bits and the five bits are indicated by CQI1, CQI2, CQI3, CQI4, and CQI5 from the highest-order bit to the lowest-order bit. One long block is associated with any one of the five bits. In other words, one of factors CQI1 through CQI5 is assigned to each of the 12 blocks. In this example, a higher-order bit is transmitted a greater number of times than a lower-order bit in one TTI. That is, the highest-order bit CQI1 is assigned to four blocks, CQI2 is assigned to three blocks, CQI3 is assigned to two blocks, CQI4 is assigned to two blocks, and the lowest-order bit CQI5 is assigned to one block. This method makes it possible to prevent a CQI value from being greatly changed even if an error occurs.

In the example shown in FIG. 5(C), it is assumed that both the acknowledgement information (ACK/NACK) and the channel quality indicator (CQI) are transmitted from the same user in the same TTI. In this example, four blocks are allocated to the acknowledgement information (ACK/NACK) and the remaining eight blocks are allocated to the channel quality indicator (CQI). Even when both the acknowledgement information (ACK/NACK) and the channel quality indicator (CQI) are transmitted from the same user, methods shown by FIGS. 5(A) and (B) may be used if multiple TTIs are available. Also, when, for example, a user moves from the center of a cell to the edge of the cell and the channel quality becomes lower, the user may stop transmission of CQI and transmit only ACK/NACK. Types of information to be transmitted via an uplink control channel may be changed as needed and reported by upper-layer signaling.

Thus, the block modulation pattern generating unit 306 of FIG. 3 generates one factor for each of 12 blocks all allocated to the channel quality indicator or allocated to both of the channel quality indicator and the acknowledgement information. In other words, the block modulation pattern generating unit 306 generates 12 factors (first through twelfth factors) in total for each TTI. In another case, the block modulation pattern generating unit 306 generates one factor for each of 14 blocks all allocated to the acknowledgement information, and generates 14 factors (first through fourteenth factors) in total for each TTI.

The block modulation unit 308 of FIG. 3 generates the first long block by multiplying all chips of a CAZAC sequence (the sequence length may correspond to one long block) assigned to the user device by a first factor, and generates the second long block by multiplying all chips of the same CAZAC sequence by a second factor. The block modulation unit 308 generates the remaining long blocks in a similar manner and thereby generates an information sequence to be transmitted in one TTI. The CAZAC sequence commonly used for all blocks is an orthogonal code sequence assigned to the user device and used to distinguish the user device in the serving cell. Characteristics of CAZAC codes are described later.

The discrete Fourier transform unit (DFT) 310 performs discrete Fourier transformation to transform time-domain information into frequency-domain information.

The sub-carrier mapping unit 312 performs frequency-domain mapping. Particularly, when frequency division multiplexing (FDM) is employed to multiplex multiple user devices, the sub-carrier mapping unit 312 maps signals to frequencies determined by the frequency determining unit 336. In this embodiment, two types of FDM schemes are used: localized FDM and distributed FDM. In localized FDM, a frequency band that is consecutive on the frequency axis is allocated to each user. In distributed FDM, a downlink signal is generated such that it includes multiple intermittent frequency components distributed across a wide frequency band (across the frequency band $F_{RB2}$ dedicated for uplink control channels).

The inverse fast Fourier transform unit (IFFT) 314 performs inverse Fourier transformation to transform a frequency-domain signal back into a time-domain signal.

The cyclic prefix (CP) adding unit 316 attaches a cyclic prefix (CP) to information to be transmitted. The cyclic prefix (CP) functions as a guard interval for absorbing the multipath propagation delay and the difference between reception timings of user signals at the base station.

The multiplexing unit 318 multiplexes a channel quality indicator or a combination of a channel quality indicator and acknowledgement information with a pilot channel, and thereby generates transmission symbols. The pilot channel is transmitted using the short blocks (SB1, SB2) shown in the frame configuration of FIG. 4. The acknowledgement information is not multiplexed with a pilot channel.

The RF transmission circuit 320 performs digital-to-analog conversion, frequency conversion, and band limitation on the transmission symbols to transmit them on a radio frequency.

The power amplifier 322 adjusts the transmission power of the transmission symbols.

The duplexer 324 properly separates transmission signals and received signals to achieve concurrent communications.

The code information identification unit 330 identifies code information including a CAZAC sequence (sequence number) assigned to the user device, a cyclic shift amount for the CAZAC sequence, and information regarding a transmission band. The code information may be obtained from broadcast information in a broadcast channel or may be reported separately to each user device from the base station. For example, an upper-layer signaling channel such as an L3 control channel may be used to report the code information separately to each user. The code information identification unit 330 also identifies an orthogonal code sequence used as a factor set (block spreading code sequence) by which each set of two or more blocks is multiplied.

The CAZAC code generating unit 332 generates a CAZAC sequence based on the sequence number specified by the code information.

The cyclic shift unit 334 cyclically reorders the CAZAC sequence according to the cyclic shift amount specified by the code information and thereby generates a different code.

Characteristics of CAZAC codes are described below.

Figure 6:
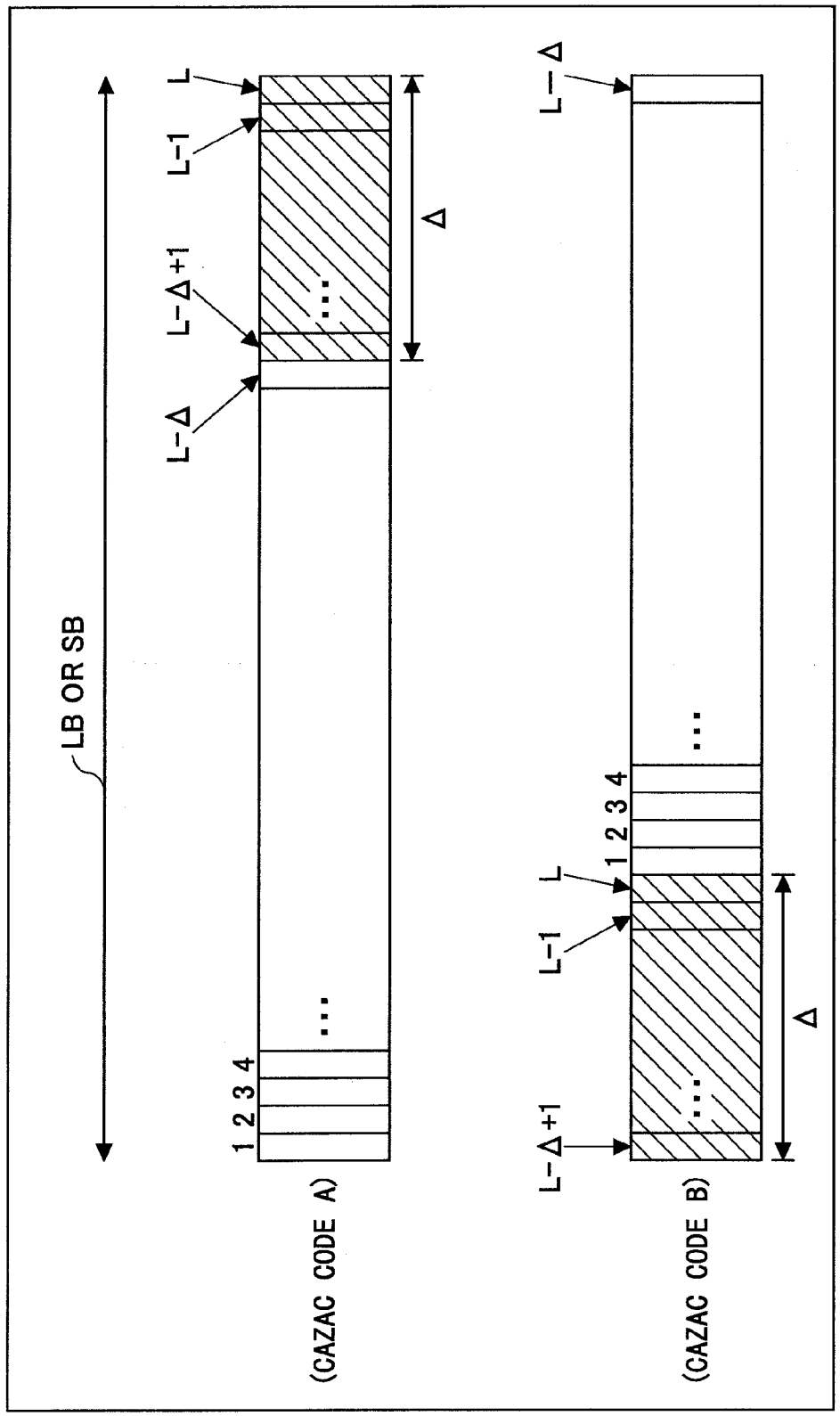
FIG. 6 is a drawing used to describe characteristics of Constant Amplitude Zero Auto-Correlation (CAZAC) codes.

In FIG. 6, a CAZAC code A has a code length L. For descriptive purposes, it is assumed that the code length corresponds to the duration of L samples or L chips. However, this assumption is not essential for the present invention. A CAZAC code B shown in the lower half of FIG. 6 is generated by moving Δ samples (indicated by hatching) including the sample (the L-th sample) at the end of the CAZAC code A to the head of the CAZAC code A. In this case, with respect to Δ=0 through (L−1), the CAZAC codes A and B become orthogonal to each other. That is, a base CAZAC code and a CAZAC code generated by cyclically shifting the base CAZAC code become orthogonal to each other. Therefore, theoretically, when one CAZAC code with a code length L is given, it is possible to generate a group of L CAZAC codes that are orthogonal to each other. The CAZAC code A and a CAZAC code C that cannot be obtained by cyclically shifting the CAZAC code A are not orthogonal to each other. Still, however, the cross-correlation level between the CAZAC code A and the CAZAC code C is far smaller than a cross-correlation level between the CAZAC code A and a random code that is not a CAZAC code. Therefore, using CAZAC codes is also preferable to reduce the cross-correlation level (interference level) between non-orthogonal codes.

In this embodiment, a CAZAC code selected from a group of CAZAC codes (a group of code sequences generated by cyclically shifting a CAZAC code) having the above described characteristics is assigned to each user device. More specifically, in this embodiment, among L orthogonal codes, $L/L_A$ CAZAC codes obtained by cyclically shifting a base CAZAC code by $\Delta = n \times L_A$ (n=0, 1, . . . , (L−1)/$L_A$) are actually used as pilot channels of mobile stations. $L_A$ is a value determined based on the amount of multipath propagation delay. This approach makes it possible to properly maintain the orthogonality between uplink control channels transmitted from respective user devices even under a multipath propagation environment. Details of CAZAC codes are described, for example, in the following documents: D. C. Chu, "Polyphase codes with good periodic correlation properties", IEEE Trans. Inform. Theory, vol. IT-18, pp. 531-532, July 1972; and 3GPP, R1-050822, Texas Instruments, "On allocation of uplink sub-channels in EUTRA SC-FDMA".

The block spreading unit 335 generates a factor set (block spreading code) including a predetermined number of factors used to multiply respective long blocks (LB). The block spreading code is an orthogonal code sequence specified by information sent from the code information identification unit 330.

Figure 7:
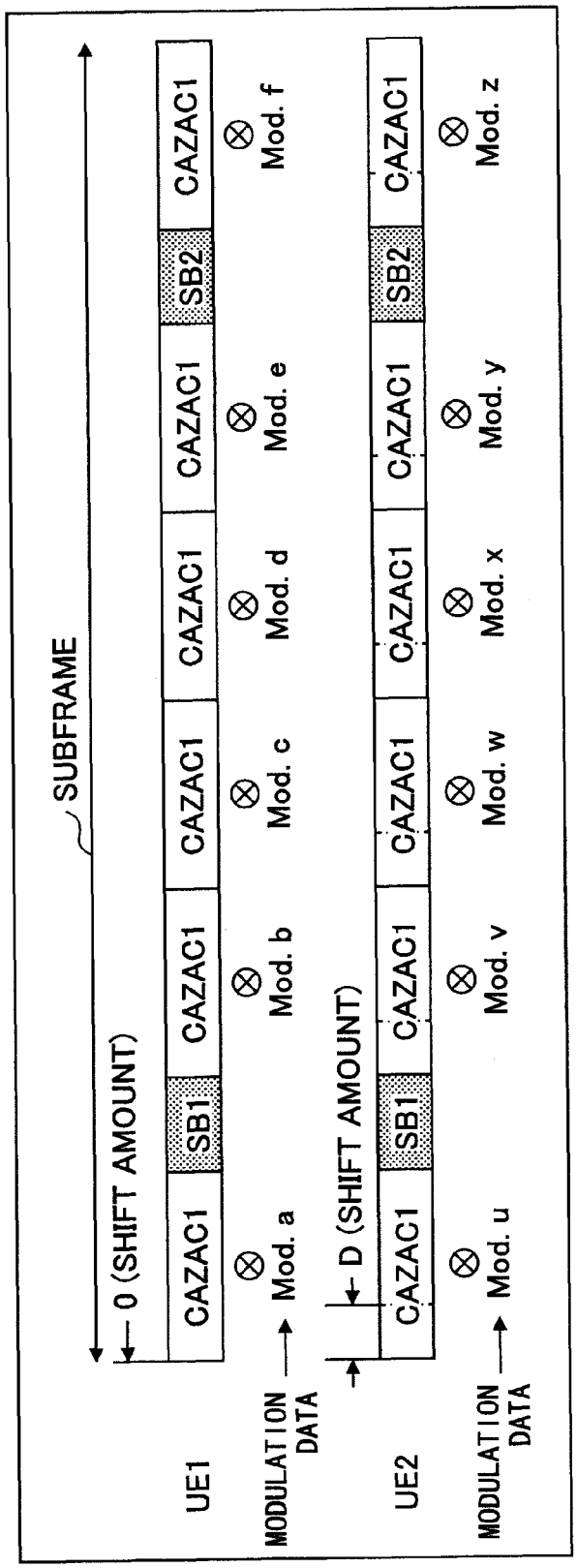
FIG. 7 is a drawing illustrating factors by which long blocks are multiplied.

FIG. 7 shows subframes of a first user device UE1 and a second user device UE2 before they are multiplied by block spreading codes. The first and second user devices use the same CAZAC sequence (CAZAC1), but use different cyclic shift amounts $\Delta$. Therefore, two subframes of the user devices become orthogonal to each other. In FIG. 7, "Mod.a" indicates data for modulating the first long block of the first user device UE1, i.e., a factor for multiplying the first long block. "Mod.a" through "Mod.f" correspond to first through sixth factors (or seventh through eighth factors) for the first user device UE1. "Mod.u" through "Mod.z" correspond to first through sixth factors (or seventh through eighth factors) for the second user device UE2.

Figure 8:
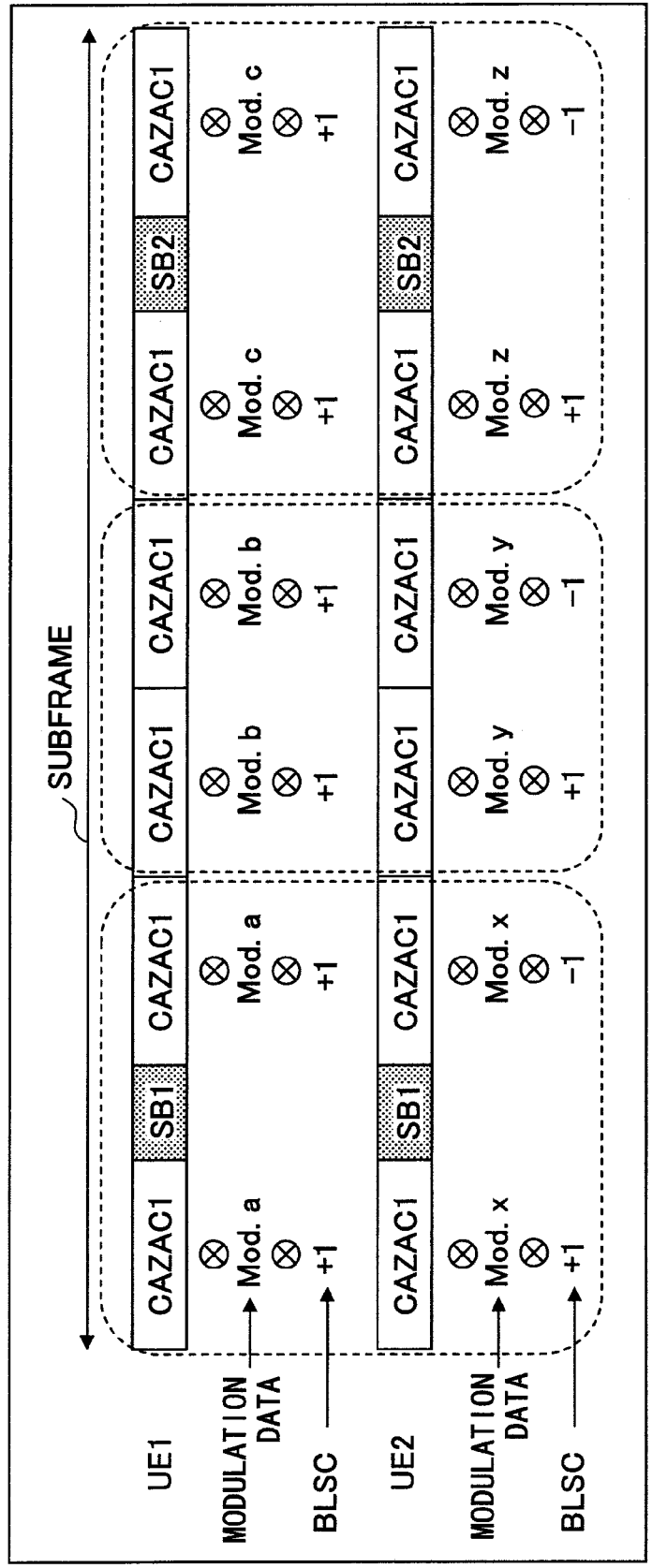
FIG. 8 is a drawing illustrating exemplary factors and block spreading codes by which long blocks are multiplied.

FIG. 8 shows an example where long blocks of the first user device UE1 and the second user device UE2 are multiplied by block spreading codes. In this example, one factor (separately from modulation data) is provided for each one of a pair of long blocks. The factors constitute a block spreading code (BLSC). As shown in each area surrounded by a dotted line in FIG. 8, an orthogonal code (1, 1) is provided for the first user device UE1 and an orthogonal code (1, −1) is provided for the second user device UE2. As described in the first embodiment, as long as one or more long blocks are multiplied by the same factor (value), the orthogonality of the CAZAC code forming the long blocks is not lost. Therefore, when factor sets used to multiply sets of two or more blocks of respective users are orthogonal to each other, the orthogonality of CAZAC codes is maintained and the users are orthogonalized. In this case, the contents of two or more blocks to be multiplied by one orthogonal code must be the same. In the example of FIG. 8, both of the first and second factors of the first user device UE1 are "Mod.a", both of the third and fourth factors are "Mod.b", and both of the fifth and sixth factors are "Mod.c". Similarly, both of the first and second factors of the second user device UE2 are "Mod.x", both of the third and fourth factors are "Mod.y", and both of the fifth and sixth factors are "Mod.z". For this reason, information that can be represented by the first through twelfth factors may be limited to some extent. However, since the number of bits required to represent information such as ACK/NACK is relatively small as described with reference to FIG. 5, this limitation does not cause a serious problem.

Since the first and second user devices UE1 and UE2 can be distinguished by the block spreading codes (1, 1) and (1, −1), the same cyclic shift amount may be used for the user devices UE1 and UE2 to cyclically shift the CAZAC code (i.e., it is not essential to use different cyclic shift amounts $\Delta$). Although long blocks are multiplied by factors in this embodiment, short blocks (SB) may also be multiplied by factors.

Thus, using block spreading codes in addition to cyclically shifting a CAZAC code makes it possible to increase the number of users that can be orthogonally multiplexed by codes. Also, since this method increases the number of users that can be multiplexed by CDM, it is possible to more effectively prevent frequent changes of the transmission bandwidth caused by FDM in a case where both CDM and FDM are employed. In other words, this method makes it possible to reduce the frequency of reporting changes in the bandwidth and thereby makes it possible to greatly reduce the amount of radio resources necessary for the reporting.

The frequency determining unit 336 of FIG. 3 determines frequencies to be used by respective user devices when frequency division multiplexing (FDM) is employed for transmission of uplink control channels from the user devices.

The pilot signal generating unit 338 generates a pilot channel to be included in an uplink control channel that includes a channel quality indicator or a combination of a channel quality indicator and acknowledgement information. The pilot signal generating unit 338 does not generate a pilot channel for an uplink control channel including acknowledgement information. As described above, the pilot channel is transmitted using the short blocks (SB1, SB2) shown in the frame configuration of FIG. 4. The pilot channel is also made of a CAZAC code assigned to the user device. The CAZAC code for the pilot channel may also be identified by a sequence number and a cyclic shift amount. Generally, a long block (LB) and a short block (SB) have different lengths, periods, or numbers of chips. Therefore, a CAZAC code $C_L$ for the long block (LB) and a CAZAC code $C_S$ for the short block (SB) may be generated separately. Still, since both of the CAZAC codes $C_L$ and $C_S$ are used for the same user device, the CAZAC codes $C_L$ and $C_S$ may be related to each other (for example, the CAZAC code $C_S$ may be made of a part of the CAZAC code $C_L$).

Figure 9:
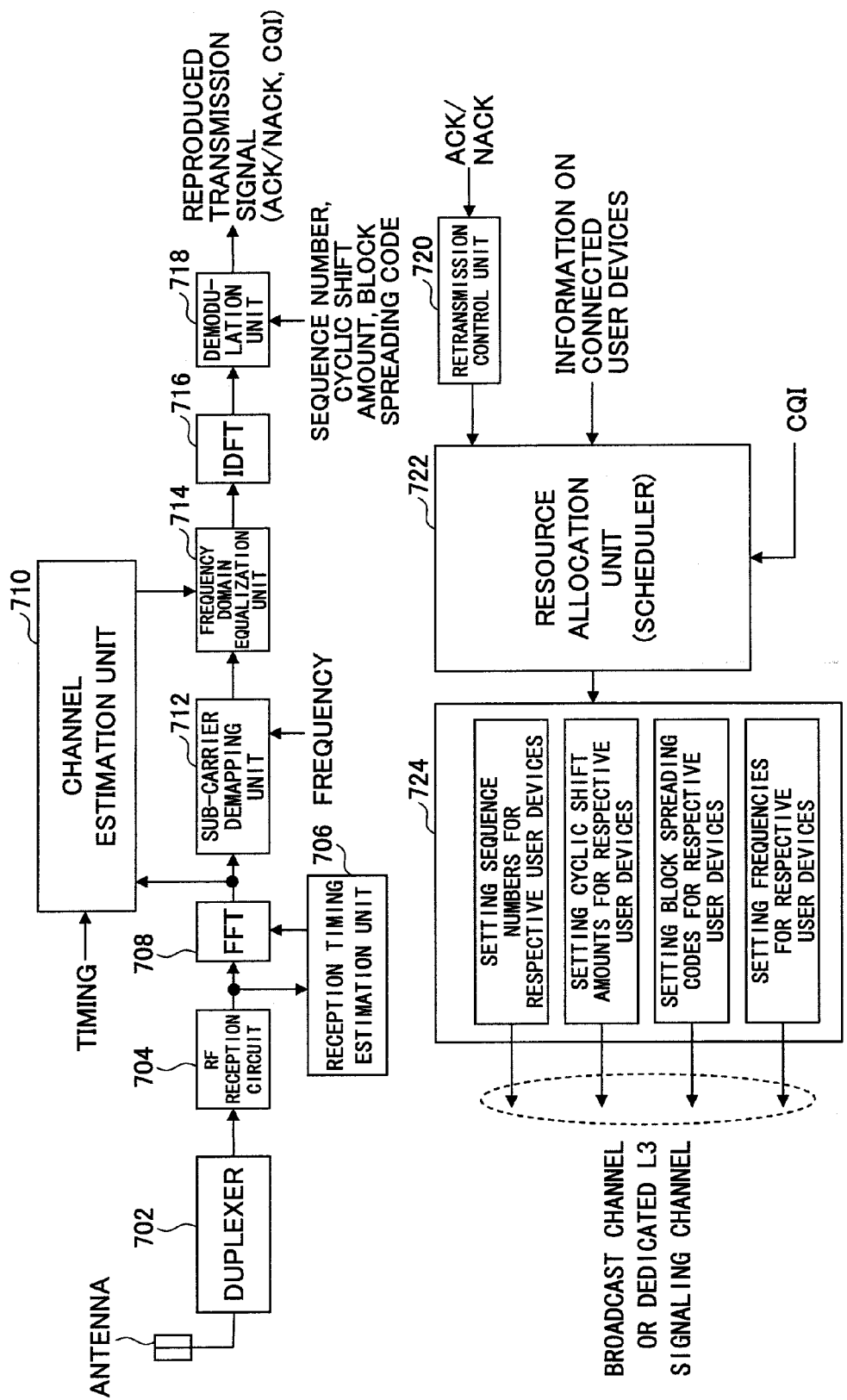
FIG. 9 is a partial block diagram of a base station according to an embodiment of the present invention.

FIG. 9 shows a base station according to an embodiment of the present invention. The base station shown in FIG. 9 includes a duplexer 702, an RF reception circuit 704, a reception timing estimation unit 706, a fast Fourier transform unit (FFT) 708, a channel estimation unit 710, a sub-carrier demapping unit 712, a frequency domain equalization unit 714, an inverse discrete Fourier transform unit (IDFT) 716, a demodulation unit 718, a retransmission control unit 720, a scheduler 722, and a code information setting unit 724.

The duplexer 702 properly separates transmission signals and received signals to achieve concurrent communications.

The RF reception circuit 704 performs analog-to-digital conversion, frequency conversion, and band limitation on received symbols for baseband processing.

The reception timing estimation unit 706 determines a reception timing based on a synchronization channel or a pilot channel in a received signal.

The fast Fourier transform unit (FFT) 708 performs Fourier transformation to transform time-domain information into frequency-domain information.

The channel estimation unit 710 estimates uplink channel conditions based on the reception quality of an uplink pilot channel and outputs information for channel compensation. The channel estimation unit 710 determines the content of a signal based on the reception timing and if the signal includes only the acknowledgement information, turns off the function for channel estimation.

The sub-carrier demapping unit 712 performs frequency domain demapping. This demapping process is performed according to frequency domain mapping performed by the user device.

The frequency domain equalization unit 714 equalizes the received signal based on the channel estimation result.

The inverse discrete Fourier transform unit (IDFT) 716 performs inverse discrete Fourier transformation to transform a frequency-domain signal back into a time-domain signal.

The demodulation unit 718 demodulates the received signal. In this embodiment, the demodulation unit 718 demodulates an uplink control channel, and outputs a downlink channel quality indicator (CQI) and/or acknowledgement information (ACK/NACK) for a downlink data channel.

The retransmission control unit 720 prepares a new packet or a retransmission packet according to the content of the acknowledgement information (ACK/NACK).

The scheduler 722 determines downlink resource allocation based on the downlink channel quality indicator (CQI) and other criteria. The scheduler 722 also determines uplink resource allocation based on reception quality of pilot channels transmitted from user devices and other criteria. The scheduler 722 outputs the allocation results as scheduling information. The scheduling information includes frequencies, time, and transport formats (data modulation schemes and channel coding rates) to be used for signal transmission, The code information setting unit 724, based on the scheduling information, generates code information including sequence numbers indicating CAZAC codes, cyclic shift amounts, allocated frequency bands, and information indicating block spreading codes used in uplink by user devices. The code information may be reported collectively to user devices via a broadcast channel or may be reported separately to respective user devices. When the code information is reported via a broadcast channel, it is necessary to configure the broadcast information such that each user device can uniquely identify code information for itself.

The base station of this embodiment uses non-coherent detection for the acknowledgement information (ACK/NACK).

Figure 10:
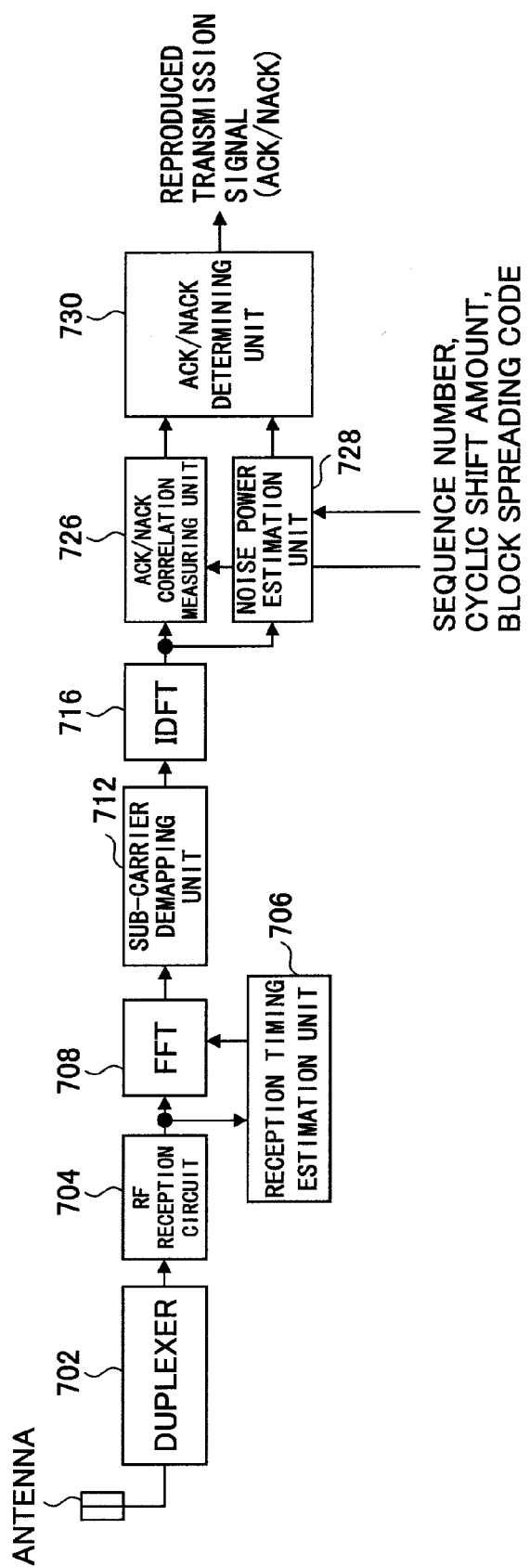
FIG. 10 is a partial block diagram of a base station according to an embodiment of the present invention.

An exemplary configuration of a base station using non-coherent detection is described below with reference to FIG. 10. Needless to say, an actual base station may include both of the configurations shown in FIGS. 9 and 10. The base station shown in FIG. 10 includes a duplexer 702, an RF reception circuit 704, a reception timing estimation unit 706, a fast Fourier transform unit (FFT) 708, a sub-carrier demapping unit 712, an inverse discrete Fourier transform unit (IDFT) 716, an ACK/NACK correlation measuring unit 726, a noise power estimation unit 728, and an ACK/NACK determining unit 730.

The duplexer 702 properly separates transmission signals and received signals to achieve concurrent communications.

The RF reception circuit 704 performs analog-to-digital conversion, frequency conversion, and band limitation on received symbols for baseband processing.

The reception timing estimation unit 706 determines a reception timing based on a synchronization channel in a received signal.

The fast Fourier transform unit (FFT) 708 performs Fourier transformation to transform time-domain information into frequency-domain information.

The sub-carrier demapping unit 712 performs frequency-domain demapping. This demapping process is performed according to the frequency domain mapping performed by the user device.

The inverse discrete Fourier transform unit (IDFT) 716 performs inverse discrete Fourier transformation to transform a frequency-domain signal back into a time-domain signal.

Next, exemplary allocation of resources for acknowledgement information in a case where non-coherent detection is employed is described with reference to FIG. 11.

In this example, it is assumed that multiplexing is achieved using cyclic shift numbers 0-5 and block spreading code numbers 0-6. In this case, one orthogonal resource is identified by a cyclic shift number and a block spreading code number. The cyclic shift numbers 0-2 are assigned to acknowledgement (ACK) and the cyclic shift numbers 3-5 are assigned to negative acknowledgement (NACK).

Figure 11:
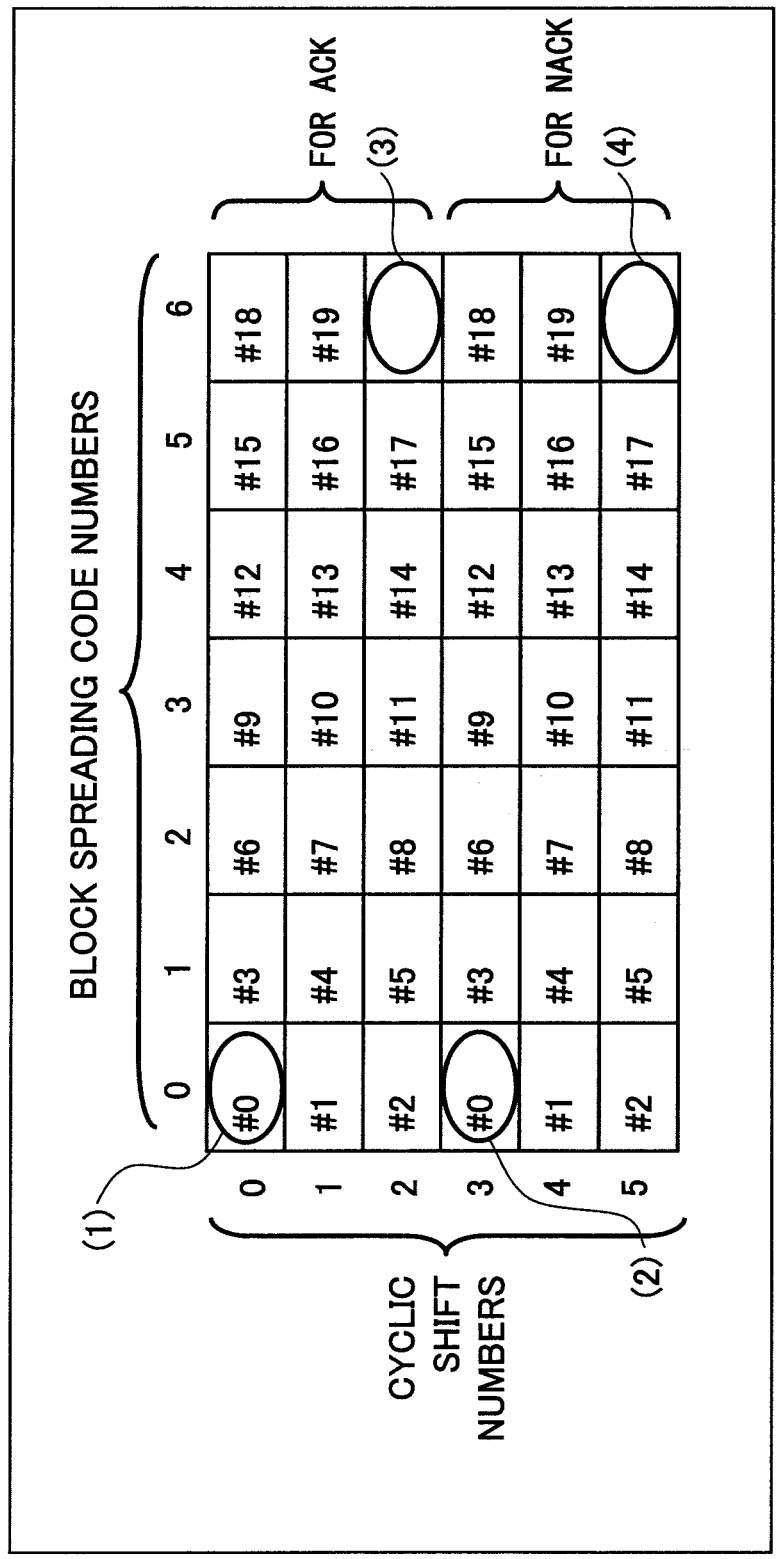
FIG. 11 is a drawing illustrating exemplary allocation of resources for acknowledgement information in a case where non-coherent detection is employed.

In FIG. 11, (1) indicates that user #0 uses a resource identified by the cyclic shift number 0 and the block spreading code number 0 to transmit ACK. Similarly, (2) indicates that user #0 uses a resource identified by the cyclic shift number 3 and the block spreading code number 0 to transmit NACK.

Meanwhile, (3) and (4) indicate resources commonly used for all users to estimate a noise power level (resources that are not used by users for signal transmission) which is used as a reference power level when determining the power level of ACK/NACK.

When the power level of ACK/NACK is determined based on other criteria as described later (e.g., when the noise power level is estimated using a different method), resources (3) and (4) are not used for this purpose and may be used for transmission of ACK/NACK from user #20.

The noise power estimation unit 728 estimates a noise power level used as a reference power level in determining the power level of ACK/NACK based on an input CAZAC sequence number, cyclic shift number, and/or block spreading code number, and inputs the estimated noise power level to the ACK/NACK determining unit 730. For example, referring to FIG. 11 showing exemplary allocation of resources for acknowledgement information in a case where non-coherent detection is employed, the noise power estimation unit 728 measures the correlation power level of a resource identified by the cyclic shift number 2 and the block spreading code number 6.

The ACK/NACK correlation measuring unit 726 measures correlation power levels of resources used to transmit ACK/NACK based on input CAZAC sequence numbers, cyclic shift numbers, and/or block spreading code numbers, and inputs the measured correlation power levels to the ACK/NACK determining unit 730.

For example, referring to FIG. 11 showing exemplary allocation of resources for acknowledgement information in a case where non-coherent detection is employed, the ACK/NACK correlation measuring unit 726 measures the correlation power levels of a resource identified by the cyclic shift number 0 and the block spreading code number 0 and a resource identified by the cyclic shift number 3 and the block spreading code number 0.

The ACK/NACK determining unit 730 compares the correlation power levels with the estimated noise power level (reference power level) and if one of the correlation power levels is greater than the noise power level, determines that a signal corresponding to the correlation power level greater than the noise power level has been received. The reference power level may be obtained by adding a certain offset to the estimated noise power level.

Figure 12:
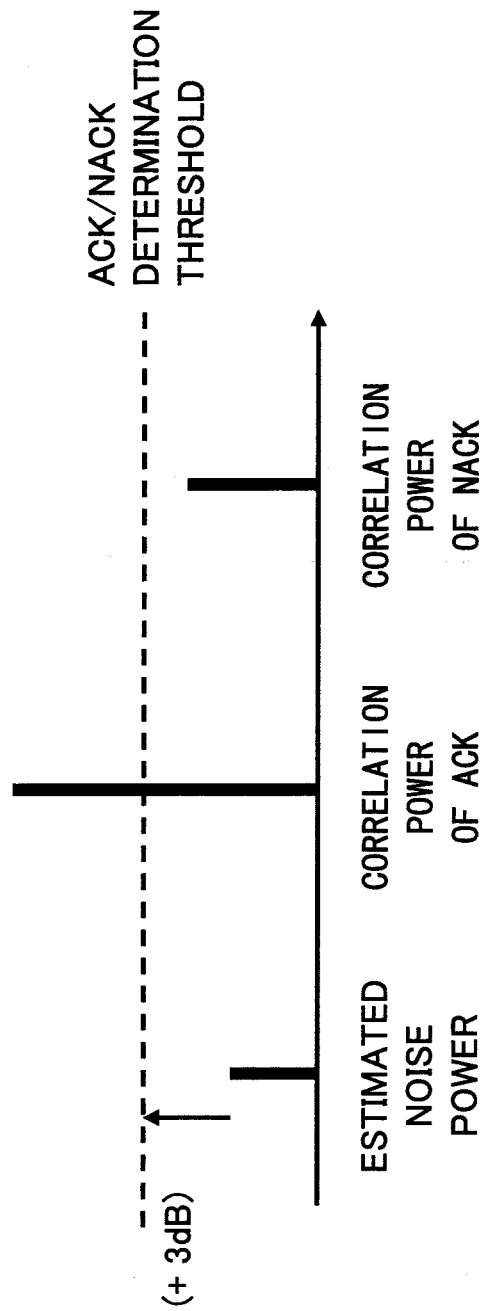
FIG. 12 is a drawing illustrating a method of determining acknowledgement information in a case where non-coherent detection is employed.

For example, as shown in FIG. 12, an offset is added to the estimated noise power level to obtain an ACK/NACK determination threshold and the correlation power levels of ACK and NACK are compared with the ACK/NACK determination threshold. In this example, the correlation power level of ACK is greater than the ACK/NACK determination threshold and therefore the ACK/NACK determining unit 730 determines that ACK has been received.

If both of the correlation power levels of ACK and NACK are greater than the reference power level, the ACK/NACK determining unit 730 determines that one of ACK and NACK with a higher power level has been received. If both of the correlation power levels of ACK and NACK are less than or equal to the reference power level, the ACK/NACK determining unit 730 determines that none of ACK and NACK has been received or one of ACK and NACK with a higher power level has been received.

Alternatively, the user device may be configured to turn off the transmission power to report acknowledgement (ACK) and to turn on the transmission power to report negative acknowledgement (NACK). In this case, the ACK/NACK determining unit 730 assumes that acknowledgement (ACK) is reported if no signal is transmitted. This configuration makes it possible to reduce interference with other cells when reporting acknowledgement (ACK).

Figure 13:
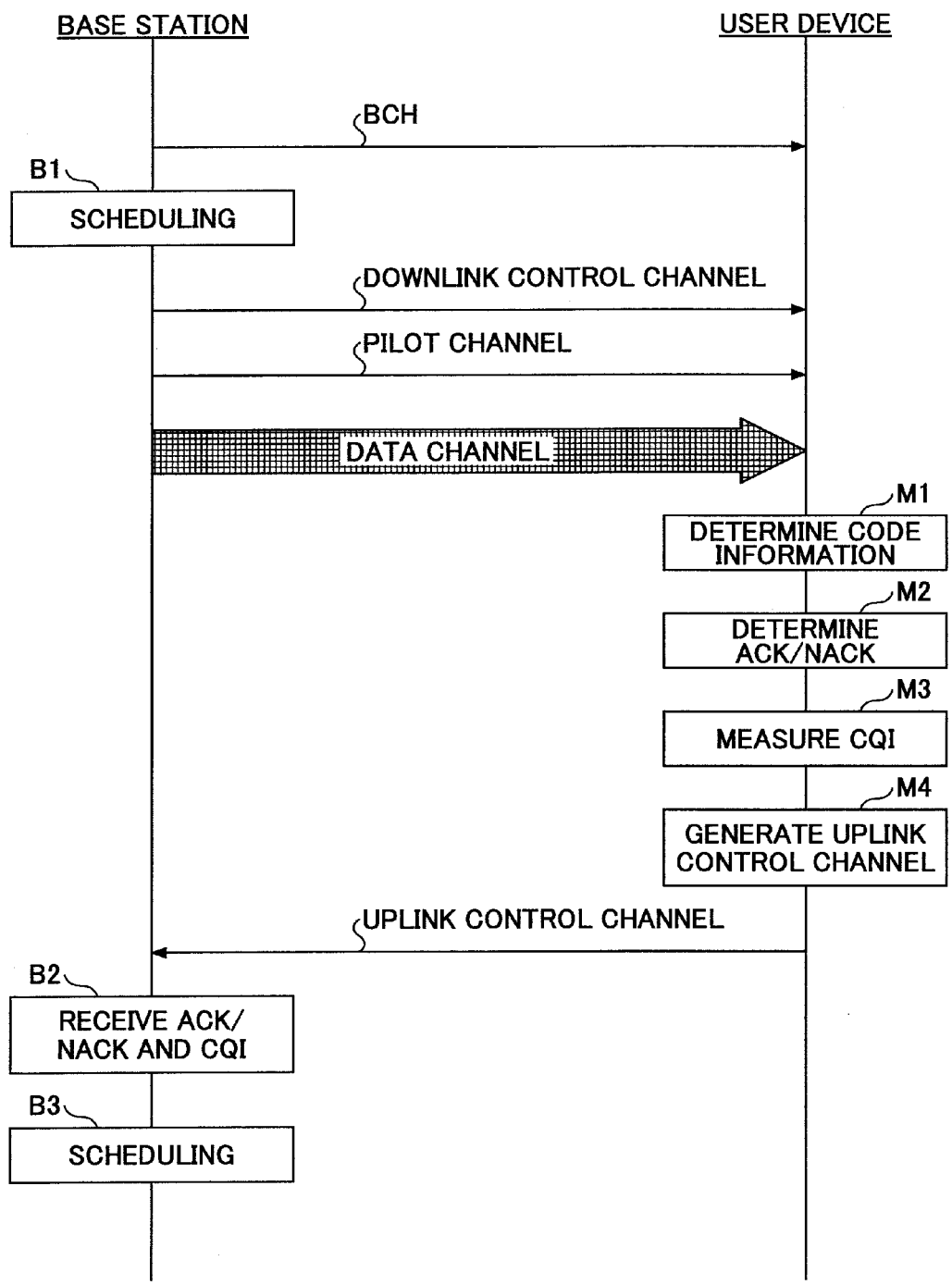
FIG. 13 is a timing chart showing an exemplary process according to an embodiment of the present invention.

FIG. 13 shows an exemplary process according to an embodiment of the present invention. In this exemplary process, general code information related to all user devices is transmitted via a broadcast channel (BCH). Each user device uniquely identifies specific code information for itself from the broadcast information. The general code information, for example, includes information indicating N CAZAC sequences (C#1, C#2, . . . , C#N) are used in the cell, M cyclic shift amounts (0, $L_A$, . . . , (M−1)×$L_A$) are provided for each of the CAZAC sequences, and F frequency bands (Bw1, Bw2, . . . , BwF) are used for frequency division multiplexing (FDM).

In step B1, the base station performs downlink scheduling and transmits a downlink control channel (L1/L2 control channel), a downlink data channel, and a pilot channel to the user device.

In step M1, the user device identifies information (code information for the user device) on a code used for an uplink control channel based on information in the downlink control channel.

Figure 14:
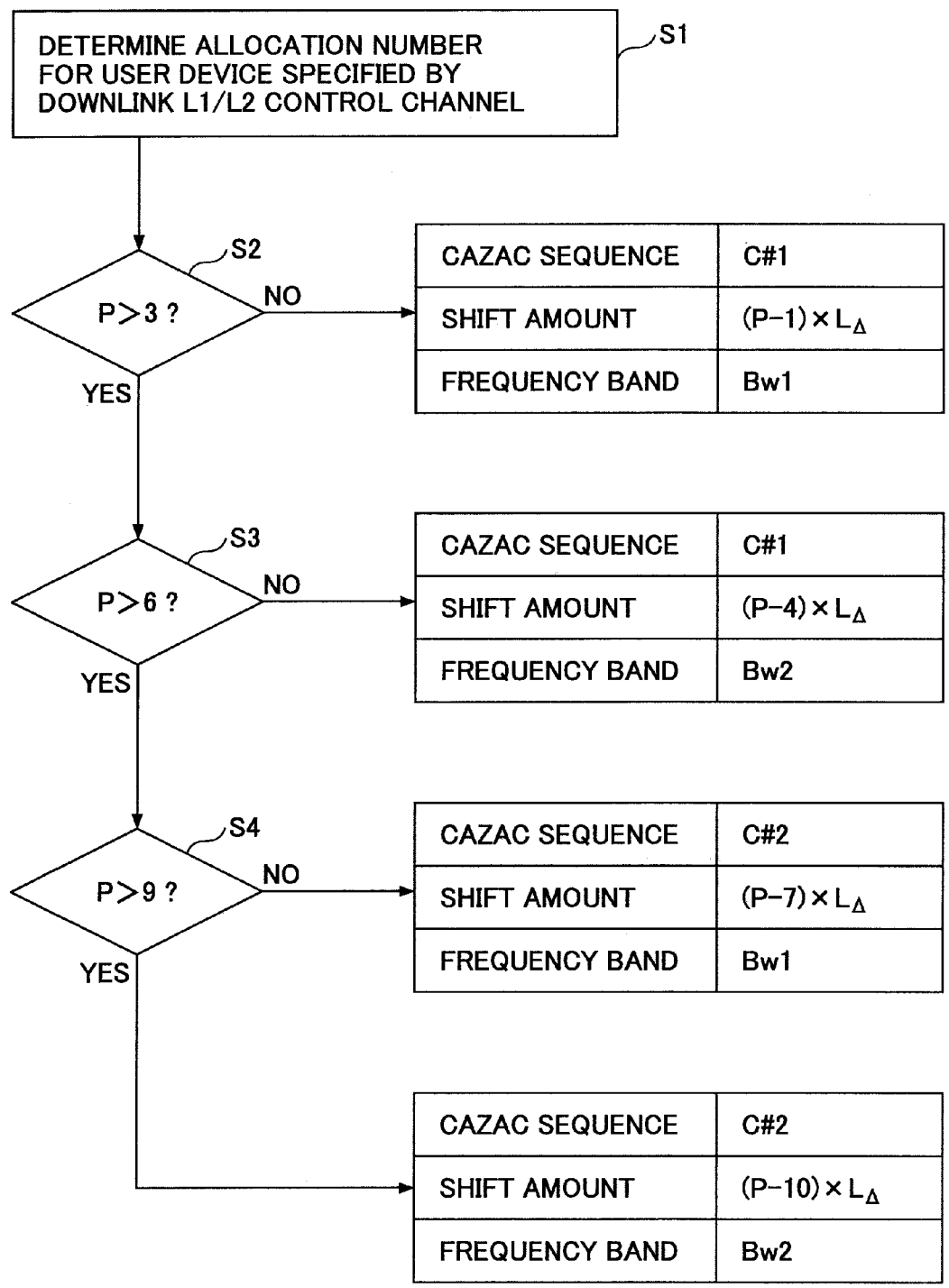
FIG. 14 is a flowchart showing a method of identifying code information based on broadcast information and allocation information.

FIG. 14 shows an exemplary method of identifying code information in step M1. Here, for brevity, it is assumed that two CAZAC sequences (C#1, C#2), three cyclic shift amounts (0, $L_A$, 2$L_A$), and two frequency bands (Bw1, Bw2) are available. In this case, 2×3×2=12 user devices can be distinguished. These values are just examples, and any other appropriate values may be used.

In step S1, the user device determines an allocation number P (1, 2, . . . , or 12) assigned to the user device by the downlink control channel.

In step S2, the user device determines whether the allocation number P is greater than 3. If the allocation number P is not greater than 3 (P=1, 2, or 3), the CAZAC sequence C#1, a cyclic shift amount (P−1)×$L_A$, and the frequency band Bw1 are used. If the allocation number P is greater than 3, the process proceeds to step S3.

In step S3, the user device determines whether the allocation number P is greater than 6. If the allocation number P is not greater than 6 (P=4, 5, or 6), the CAZAC sequence C#1, a cyclic shift amount (P−4)×$L_A$, and the frequency band Bw2 are used. If the allocation number P is greater than 6, the process proceeds to step S4.

In step S4, the user device determines whether the allocation number P is greater than 9. If the allocation number P is not greater than 9 (P=7, 8, or 9), the CAZAC sequence C#2, a cyclic shift amount (P−7)×$L_A$, and the frequency band Bw1 are used. If the allocation number P is greater than 9 (P=10, 11, or 12), the CAZAC sequence C#2, a cyclic shift amount (P−10)×$L_A$, and the frequency band Bw2 are used.

Figure 15:
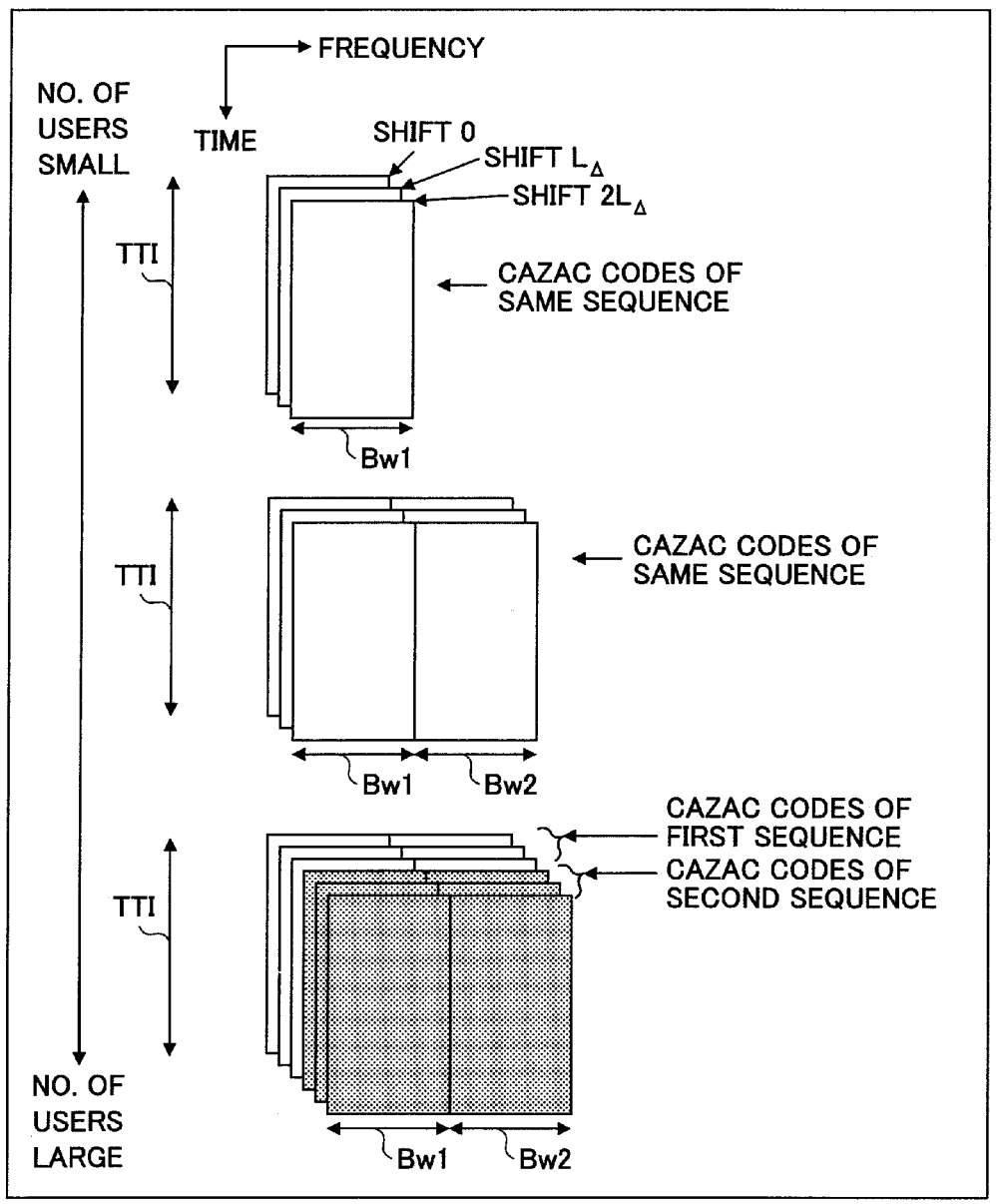
FIG. 15 is a drawing illustrating exemplary CAZAC codes, cyclic shift amounts, and frequency bands.

FIG. 15 shows exemplary CAZAC codes, cyclic shift amounts, and frequency bands identified by the process shown in FIG. 14. As shown in FIG. 15, users are first multiplexed by code division multiplexing (CDM) using CAZAC codes obtained from the same sequence. When the number of users exceeds a limit, extra users are code-division-multiplexed using the same set of CAZAC codes in a different frequency band. Similarly, as the number of users increases, users are code-division-multiplexed using the same set of CAZAC codes in respective frequency bands available. Also, FDM may be employed in addition to block spreading. In other words, in this embodiment, both CDM and FDM are employed, but CDM is given preference over FDM. When the number of users exceeds the number of users that can be distinguished by CDM using a set of CAZAC codes and FDM, another set of CAZAC codes obtained from a different CAZAC sequence are used for CDM and the users are multiplexed by CDM and FDM in a similar manner. Also, non-orthogonal CDM using different CAZAC codes may be used in addition to orthogonal CDM (including block spreading) and FDM. Here, let us assume that N CAZAC sequences (C#1, C#2, . . . , C#N) are used in the cell, M cyclic shift amounts (0, $L_{66}$, . . . , (M−1)×$L_A$) are provided for each of the CAZAC sequences, and F frequency bands (Bw1, Bw2, . . . , BwF) are used for frequency division multiplexing (FDM). In this case, a CAZAC sequence number is represented by (P/(M×F)) (digits after the decimal point are rounded up); the ordinal number of a frequency band is represented by ((P−(n−1)×(M×F))/M); and a cyclic shift amount is represented by a value obtained by multiplying (P−((n−1)×(M×F))−(f−1)×M)=PmodM by $L_A$.

In the example described with reference to FIGS. 14 and 15, use of another frequency band Bw2 is started when the allocation number or the number of multiplexed users exceeds 3. Alternatively, the same frequency band Bw1 and a different CAZAC sequence C#2 may be used when the number of multiplexed users is greater than 3 and less than or equal to 6. Each of the CAZAC sequences C#1 and C#2 cannot be generated by cyclically shifting the other and they are not orthogonal to each other. However, the CAZAC sequences C#1 and C#2 can be used for the same frequency band because the cross-correlation level between them is relatively small.

Thus, the user device identifies its code information based on the broadcast information and the allocation number P. The identified code information is input to the CAZAC code generating unit 332, the cyclic shift unit 334, the frequency determining unit 336, and the pilot signal generating unit 338 shown in FIG. 3.

In step M2 of FIG. 13, the user device determines whether there is an error in each packet of the downlink data channel. This error detection may be performed by cyclic redundancy checking (CRC) or any other appropriate error detection method known in the relevant technical field. For each packet, the user device generates acknowledgement information indicating acknowledgement (ACK) if no error is found (or a found error is within an acceptable range) or generates acknowledgement information indicating negative acknowledgement (NACK) if an error is found.

In step M3, the user device measures the reception quality of the downlink pilot channel and generates a channel quality indicator (CQI) by converting the measurement into one of values in a predetermined range. For example, the user device converts the measured reception quality (e.g., SIR) into a CQI value indicating one of 32 levels and represented by 5 bits.

The order of steps M2 and M3 may be changed. That is, determination of the acknowledgement information and measurement of the channel quality indicator may be performed at any appropriate timings.

In step M4, the user device generates an uplink control channel used to report the acknowledgement information (ACK/NACK) and/or the channel quality indicator (CQI) to the base station. As described above, the block modulation pattern generating unit 306 of FIG. 3 generates one factor for each of 12 blocks all allocated to the channel quality indicator or allocated to both of the channel quality indicator and the acknowledgement information. In other words, the block modulation pattern generating unit 306 generates 12 factors (first through twelfth factors) in total for each TTI. In another case, the block modulation pattern generating unit 306 generates one factor for each of 14 blocks all allocated to the acknowledgement information, and generates 14 factors (first through fourteenth factors) in total for each TTI.

The uplink control channel has a frame configuration as shown in FIGS. 4 and 5. Alternatively, each subframe may include seven long blocks. For example, a first long block (LB1) is generated by multiplying the entire (cyclically-shifted) CAZAC sequence assigned to the user device by the first factor. A second long block (LB2) is generated by multiplying the same CAZAC sequence by the second factor. Similarly, a Kth long block (LBK) is generated by multiplying the same CAZAC sequence by a Kth factor. A frame of the uplink control channel is generated in this manner.

Then, the generated uplink control channel is transmitted via a dedicated frequency band from the user device to the base station.

In step B2, the base station receives and demodulates uplink control channels transmitted from multiple user devices. The user devices transmit similar uplink control channels, but use different CAZAC codes obtained by applying different cyclic shift amounts to the same CAZAC sequence, different frequency bands, or CAZAC codes obtained from different CAZAC sequences. Since each long block is generated by multiplying the entire CAZAC code by one factor, the base station can combine uplink control channels received from user devices in the same phase. Therefore, the orthogonality between CAZAC codes obtained by applying different cyclic shift amounts to the same CAZAC sequence is not disturbed and the base station can separate orthogonal signals from multiple user devices. According to this embodiment, even if non-orthogonal CAZAC codes are used, interference levels between user devices become lower than those when random sequences are used. Further, with this embodiment, it is possible to determine the content of acknowledgement information and/or a channel quality indicator by determining the first through twelfth factors used for the uplink control channel of each user.

In step B3, the base station performs processes such as retransmission control and resource allocation based on acknowledgement information (ACK/NACK) and/or channel quality indicators (CQI) reported via the uplink control channels from the user devices.

According to an embodiment of the present invention, non-coherent detection is used for the acknowledgement information (ACK/NACK). In this case, it is not necessary to use a pilot channel in a subframe where the acknowledge information is transmitted. This in turn makes it possible to transmit the acknowledgement information using resources that are normally allocated to a pilot channel and therefore makes it possible to increase the number of multiplexed users when transmitting the acknowledgement information.

The descriptions and drawings in the above embodiments should not be construed to be limiting the present invention. A person skilled in the art may think of variations of the above embodiments from the descriptions.

In other words, the present invention may also include various embodiments not disclosed above. Therefore, the technical scope of the present invention should be determined based on proper understanding of the claims with reference to the above descriptions.

Although the present invention is described above in different embodiments, the distinctions between the embodiments are not essential for the present invention, and the embodiments may be used individually or in combination. Although specific values are used in the above descriptions to facilitate the understanding of the present invention, the values are just examples and different values may also be used unless otherwise mentioned.

Although functional block diagrams are used to describe apparatuses in the above embodiments, the apparatuses may be implemented by hardware, software, or a combination of them. The present invention is not limited to the specifically disclosed embodiments, and variations and modifications may be made without departing from the scope of the present invention.

The present international application claims priority from Japanese Patent Application No. 2007-073725 filed on Mar. 20, 2007, the entire contents of which are hereby incorporated herein by reference.

The invention claimed is:

1. A user device that transmits at least an uplink control channel by a single-carrier scheme to a base station, the user device comprising:
   a determining unit configured to generate acknowledgement information indicating acknowledgement or negative acknowledgement for a downlink data channel;
   a control channel generating unit configured to generate the uplink control channel including the acknowledgement information; and
   a transmitting unit configured to transmit the uplink control channel using a dedicated frequency band when no resource is allocated for transmission of an uplink data channel, wherein
   the uplink control channel includes multiple unit blocks constituting a subframe and each of the unit blocks includes a sequence generated by multiplying all chips of an orthogonal code sequence assigned to the user device by a same factor;
   a correspondence between resource allocation information for the uplink control channel and orthogonal code sequences is defined such that the orthogonal code sequence assigned to the user device is identifiable based on the resource allocation information;
   the base station is configured to measure a correlation power level of the acknowledgement and a correlation power level of the negative acknowledgement and to determine that one of the acknowledgement and the negative acknowledgement whose correlation power level is greater than or equal to an ACK/NACK determination threshold has been received; and the control channel generating unit is configured to set transmission power corresponding to the acknowledgement or the negative acknowledgement to generate the uplink control channel, wherein each of the orthogonal code sequences is defined by a combination of a cyclic shift and a block spreading code, and the orthogonal code sequences include a first orthogonal code sequence assigned to the acknowledgement and a second orthogonal code sequence assigned to the negative acknowledgement; and the control channel generating unit is configured to use one of the first orthogonal code sequence and the second orthogonal code sequence depending on which one of the acknowledgement and the negative acknowledgement is to be transmitted.

2. The user device as claimed in claim 1, wherein the correspondence defines a number of users that can be code-division multiplexed for each of a first frequency band and a second frequency band in the dedicated frequency band.

3. A transmission method used by a user device that transmits at least an uplink control channel by a single-carrier scheme to a base station, the method comprising the steps of:

generating the uplink control channel including acknowledgement information indicating acknowledgement or negative acknowledgement for a downlink data channel; and transmitting the uplink control channel using a dedicated frequency band when no resource is allocated for transmission of an uplink data channel, wherein the uplink control channel includes multiple unit blocks constituting a subframe and each of the unit blocks includes a sequence generated by multiplying all chips of an orthogonal code sequence assigned to the user device by a same factor;

a correspondence between resource allocation information for the uplink control channel and orthogonal code sequences is defined such that the orthogonal code sequence assigned to the user device is identifiable based on the resource allocation information;

the base station measures a correlation power level of the acknowledgement and a correlation power level of the negative acknowledgement and determines that one of the acknowledgement and the negative acknowledgement whose correlation power level is greater than or equal to an ACK/NACK determination threshold has been received; and in the generating step, transmission power corresponding to the acknowledgement or the negative acknowledgement is set to generate the uplink control channel, wherein each of the orthogonal code sequences is defined by a combination of a cyclic shift and a block spreading code, and the orthogonal code sequences include a first orthogonal code sequence assigned to the acknowledgement and a second orthogonal code sequence assigned to the negative acknowledgement; and in the generating step, one of the first orthogonal code sequence and the second orthogonal code sequence, depending on which one of the acknowledgement and the negative acknowledgement, is used.

4. The transmission method as claimed in claim 3, wherein the correspondence defines a number of users that can be code-division multiplexed for each of a first frequency band and a second frequency band in the dedicated frequency band.

* * * * *